United States Patent [19]
Katagiri et al.

[11] Patent Number: 6,157,025
[45] Date of Patent: Dec. 5, 2000

[54] DISK SHAPED TUNABLE OPTICAL FILTER

[75] Inventors: Yoshitada Katagiri; Yoshiaki Tachikawa; Shinji Nagaoka; Fumikazu Ohira; Kazuo Aida; Ken-ichi Suzuki; Hiroshi Abe; Shingo Kawai; Hitoshi Obara, all of Tokyo, Japan

[73] Assignee: Nippon Telegraph and Telephone Corporation, Tokyo, Japan

[21] Appl. No.: 09/174,724

[22] Filed: Oct. 19, 1998

[30] Foreign Application Priority Data

| Oct. 20, 1997 | [JP] | Japan | ................................ 9-286560 |
| Oct. 30, 1997 | [JP] | Japan | ................................ 9-298361 |
| Nov. 17, 1997 | [JP] | Japan | ................................ 9-315081 |

[51] Int. Cl.$^7$ ................................................. H01J 40/14
[52] U.S. Cl. ................................... 250/226; 250/237 G
[58] Field of Search ................................ 250/226, 237 G, 250/237 R, 233, 227.21, 227.23, 234; 359/589, 568, 498, 590, 591; 356/330, 334, 300

[56] References Cited

U.S. PATENT DOCUMENTS

| 3,442,572 | 5/1969 | Illsley et al. . | |
| 3,929,398 | 12/1975 | Bates . | |
| 4,280,050 | 7/1981 | Callender et al. . | |
| 5,046,162 | 9/1991 | Ishikawa et al. . | |
| 6,075,647 | 6/2000 | Braun et al. | ............................ 359/578 |

FOREIGN PATENT DOCUMENTS

| 0 615 146 | 9/1994 | European Pat. Off. . |
| 6-265410 | 9/1994 | Japan . |

OTHER PUBLICATIONS

High–Speed Wavelength Switching and Stabilization of an Acoustooptic Tunable Filter for WDM Network in Broadcasting Stations, M. Misono, et al., IEEE Photonics Technology Letters, vol. 8, No. 4, Apr. 1996, pp. 572–574.

Polarization Independent, Linear–Tuned Interference Filter with Constant Transmission Characteristics Over 1530–1570–nm Tuning Range, N. Mekada, et al., IEEE Photonics Technology Letters, vol. 9, No. 6, Jun., 1997, pp. 782–784.

Circularly Wedged Optical Coatings. I. Theory, Alfred Thelen, Applied Optics, Aug. 1965, vol. 4, No. 8, pp. 977–982.

Circularly Wedged Optical Coatings. II. Experimental, Joseph H. Apfel, Applied Optics, Aug. 1965, vol. 4, No. 8, pp. 983–985.

Low–Loss Tunable Integrated Acoustooptical Wavelength Filter in LiNbO$_3$ with Strong Sidelobe Suppression, H. Herrmann, et al., IEEE Photonics Technology Letters, vol. 10., No. 1, Jan. 1998, pp. 120–122.

*Primary Examiner*—Que T. Le
*Attorney, Agent, or Firm*—Olson & Hierl, Ltd.

[57] ABSTRACT

A disk shaped tunable optical filter is formed by a transparent substrate in a disk shape, and a filter layer formed on a top surface of the substrate, having such a filter characteristic that a transmission central wavelength varies along a circumferential direction as a monotonic function of a viewing angle. This disk shaped tunable optical filter can be advatageously utilized in realizing a wavelength discrimination apparatus, a reference wavelength light generation apparatus, an optical packet generation apparatus, and a tunable optical filter module, which are also disclosed.

31 Claims, 17 Drawing Sheets

DISK SHAPED TUNABLE OPTICAL FILTER

BACKGROUND OF THE INVENTION

1. Field of the Invention

The present invention relates to an optical filter and its applications to a wavelength discrimination apparatus for varying transmission central wavelength at high speed in a optical communication system, to a reference wavelength light generation apparatus for generating a single mode continuous wave light of a reference wavelength based on reference wavelength grids in a high density wavelength division multiplexing network system, and to an optical packet generation apparatus for generating a time series of monochromatic pulse lights of respective wavelengths over a wide bandwidth in an optical network system that utilizes lights of different wavelengths for different channels.

2. Description of the Background Art

There has been a proposition of a wavelength division multiplexing type transmission system for transmitting a large capacity of signals using lights of different wavelengths. In such a system, it is said that there is a need for a technique to discriminate and monitor each wavelength. A typical conventional technique for wavelength discrimination has been one that utilizes reflection by a grating mirror, which is capable of discriminating each wavelength at high resolution (the minimum resolution currently available being about 0.1 nm). depending on an incident angle with respect to the grating, so that it is widely used for measurement as an optical spectrum analyzer. Also, as a wavelength discrimination apparatus with even higher resolution, there is an apparatus using the Michelson interferometer which is commercially available.

These two conventional apparatuses are suitable for a wavelength discrimination apparatus for measurement purpose, but they have sizes that are too large for their use as a component having a function for discriminating and monitoring wavelengths in a system, and there has been a need for a wavelength discrimination apparatus in a more compact size. As a scheme that can meet this requirement, there has been a proposition of a scheme (rotary tunable optical filter) in which transmission central wavelength can be made tunable by rotating a dielectric multi-layer filter.

However, this scheme has drawbacks in that the polarization dependency of the transmission efficiency becomes stronger as the incident angle becomes larger and the operable wavelength range is limited by the incident angles. In order to resolve these drawbacks, there has been a proposition of a linear optical filter in which the central wavelength varies along a straight line. When this linear optical filter is used, the central wavelength can be selected according to a position at which the optical beam passes. In addition, in this linear optical filter, there is no change in the incident angle even when the transmission wavelength is changed so that there is hardly any polarization dependency.

Also, in these optical filters, in order to realize the high speed wavelength variation, there is a need to provide a high speed driving mechanism. In this regard, the rotation mechanism basically has a high speed characteristic, but the rotary tunable optical filter requires a rotation of a disk plate so that it is difficult to realize a balance in rotation so that the rotation speed is severely limited.

On the other hand, in the case of the linear optical filter, there is a need for a large amplitude high speed shuttle motion mechanism in order to realize a wide wavelength variation capability at the same time. This requirement quantitatively amounts to the acceleration of $4 \times 10^4$ m/s$^2$ in the case of realizing the shuttle motion with an amplitude of 10 cm and a frequency of 100 Hz, for example, and the realization of this acceleration by the currently available technology would call for a gigantic actuator.

Now, in the wavelength division multiplexing network system, it is important to stabilize a reference wavelength light source with respect to reference wavelength grids calibrated to absolute wavelengths. Conventionally, a Distributed Feed-Back Laser Diode (DFB-LD) capable of realizing a wavelength controllable single mode oscillation has been proposed as the reference wavelength light source, and a method utilizing a monochrometer as shown in FIG. 1 has been proposed as a method for stabilizing the reference wavelength of this DFB-LD.

FIG. 1 shows a conventional monochrometer in which a desired spectrum is obtained at a diffraction grating 4 on a rotation stage 8 from a light source in a form of a photodiode (PD) 1 through a slit 2 and a mirror 3, and a collimated beams are obtained by a mirror 5, a slit 6 and a lens 7 and outputted to an optical fiber 9. Namely, the monochrometer has a wavelength discrimination function of a high absolute precision, where the reference wavelength light can be obtained by setting the monochrometer to the specified wavelength and controlling the laser oscillation wavelength such that the intensity of a laser beam to be discriminated becomes maximum.

However, in the apparatus for stabilizing the reference wavelength using the monochrometer as shown in FIG. 1 requires an optical system with a long optical beam path because its wavelength discrimination function utilizes the wavelength dependency of the diffraction angle by the grating, so that the apparatus becomes large.

In addition, in order to secure the wavelength stabilization, there is a need to make the optical system mechanically strong, and for this reason it is necessary to provide a frame with a very high rigidity.

Also, at a time of controlling the oscillation wavelength, it is customary to take a difference between two wavelengths and provide a feed-back so as to nullify this difference, but it is difficult to take the difference between peaks of the spectrum so that the oscillation wavelength is usually modulated at a low frequency (5 to 10 KHz) in a vicinity of the specified wavelength. However, this modulation will be superposed a intensity modulation component and this intensity modulation may cause some trouble due to noise at a time of clock extraction or the like in the transmission system.

Note that, by rotating the diffraction grating at high speed in the monochrometer described above, it is possible to construct a sample servo type wavelength control apparatus for generating good continuous monochromatic lights without wavelength modulation, but such an apparatus has a problem in that the sample servo may not function properly as there arises a limit in making the sampling period smaller because the diffraction grating is associated with a severe limitation on the number of rotations unlike the case of disk.

Furthermore, the diffraction grating monochrometer has been widely used for the purpose of carrying out the wavelength spectrum analysis which is the basic technique of the optical measurement. In this case, the specific wavelength is discriminated by diffracting only a wavelength that satisfies the Bragg condition, and the wavelength to be discriminated is selected by rotating the diffraction grating. Here, a correspondence between the wavelength and the rotation angle is defined uniquely so that the high precision measurement becomes possible by accurately controlling the rotation angle. However, it requires a long optical beam path in order to obtain the high resolution and therefore it is difficult to form a module suitable for incorporation into a system, so that its applicability has been limited.

Now, the conventional optical packet generation apparatus generates optical packets using a wavelength switch based on AOTF (Acousto-Optic Tunable Filter). Note that, throughout the present specification, the optical packets refers to time series monochromatic pulse lights with wavelengths differing at a constant time interval.

This AOTF operates as a narrow bandwidth wavelength selection switch by utilizing surface elastic waves on an electro-optic crystal (such as $LiNbO_3$) as diffraction grating, and is capable of switching wavelength at high speed. The switching speed is as fast as 10 $\mu$s or less because it is the electric switching. For example, it has been demonstrated that the switching from 1560 nm to 1552 nm in 6 $\mu$s is possible by optimizing the control system of AOTF (see M. Misono et al., "High-speed wavelength switching and stabilization of an acoutooptic tunable filter for WDM network in broadcasting stations", IEEE Photonics Technol. Lett., Vol. 4, pp. 572–574, 1996; and H. Hermann et al., "Low-Loss Tunable Integrated Acoustooptical Wavelength Filter in $LiNbO_3$ with Strong Sidelobe Suppression", IEEE Photonics Technology Letters, Vol. 10, No. 1, pp. 120–122, January 1998).

The wavelength selection function of AOTF utilizes the wavelength dependency of the diffraction grating. For this reason, there arises a limit to a wavelength at which the diffracted light can be coupled to the optical fiber again, so that the operable wavelength bandwidth is limited. This range is currently about 10 nm.

On the other hand, the large scale network system containing a CATV broadcast system or the like requires supply of optical packets by switching wavelengths over a wide bandwidth. The actual required wavelength bandwidth depends on the individual system but over 100 nm is desired in general. Hence the bandwidth of the currently available AOTF has been insufficient for this purpose.

SUMMARY OF THE INVENTION

It is therefore an object of the present invention to provide a high speed wavelength discrimination apparatus which is not associated with the conventionally encountered mechanical limitations.

It is another object of the present invention to provide a reference wavelength light generation apparatus in a compact size, which does not require a long optical beam path and a high rigidity frame, and which has a low noise and involves no rotation of the diffraction grating.

It is another object of the present invention to provide a tunable optical filter in a form of a module suitable for incorporation into a system, which is not associated with the conventionally encountered limitation on its applicability.

It is another object of the present invention to provide an optical packet generation apparatus capable of supplying optical packets over a very wide wavelength bandwidth.

According to one aspect of the present invention there is provided a disk shaped optical filter, comprising: a transparent substrate in a disk shape; and a filter layer formed on a top surface of the substrate, having such a filter characteristic that a transmission central wavelength varies along a circumferential direction as a monotonic function of a viewing angle.

According to another aspect of the present invention there is provided a high speed wavelength discrimination apparatus, comprising: a disk shaped optical filter having such a filter characteristic that a transmission central wavelength varies along a circumferential direction, which is placed in an optical beam path of collimated optical beams; and a rotation mechanism for setting the disk shaped optical filter in high speed rotations in synchronization with external signals.

According to another aspect of the present invention there is provided a reference wavelength light generation apparatus, comprising: a single mode wavelength tunable semiconductor laser light source; a disk shaped optical filter having such a filter characteristic that a transmission central wavelength varies linearly with respect to a rotation angle, through which optical beams from the light source pass; and a servo motor for rotating the disk shaped optical filter in synchronization with a clock; and a control circuit for detecting an error between an oscillation wavelength of the light source and a specified wavelength, and generating a negative feed-back control signal to control the light source so as to cancel out the error.

According to another aspect of the present invention there is provided an optical packet generation apparatus, comprising: a disk shaped optical filter having filter layers of respectively different transmission wavelengths formed on a plurality of fan-shaped regions which are divided at prescribed central angles; a rotation driving mechanism for rotating the disk shaped optical filter at a prescribed speed; a light source for outputting optical beams with at least two wavelengths which coincide with the transmission wavelengths of the filter layers; an optical beam input unit for setting the optical beams from the light source incident onto the disk shaped optical filter as collimated optical beams, substantially perpendicularly to a rotation plane of the disk shaped optical filter; and an optical beam output unit for collecting the collimated optical beams that pass through the disk shaped optical filter and outputting monochromatic optical packets of wavelengths corresponding to the transmission wavelengths of the filter layer in time series, in accordance with rotations of the disk shaped optical filter.

According to another aspect of the present invention there is provided a disk shaped optical filter module, comprising: a disk shaped optical filter having such a filter characteristic that a transmission central wavelength varies along a circumferential direction with respect to a viewing angle; a scanning mechanism for scanning a wide range of transmission central wavelengths by rotating the disk shaped optical filter while setting optical beams incident onto the disk shaped optical filter; and a correction mechanism for controlling a transmission position of the optical beams of the scanning mechanism in a tangential direction so as to correct a deviation of the transmission central wavelength scanned by the scanning mechanism.

Other features and advantages of the present invention will become apparent from the following description taken in conjunction with the accompanying drawings.

DETAILED DESCRIPTION OF THE PREFERRED EMBODIMENTS

Referring now to FIG. 2 to FIG. 8, the first embodiment of the present invention will be described in detail. This first embodiment is directed to a high speed wavelength discrimination apparatus according to the present invention.

Figure 1:
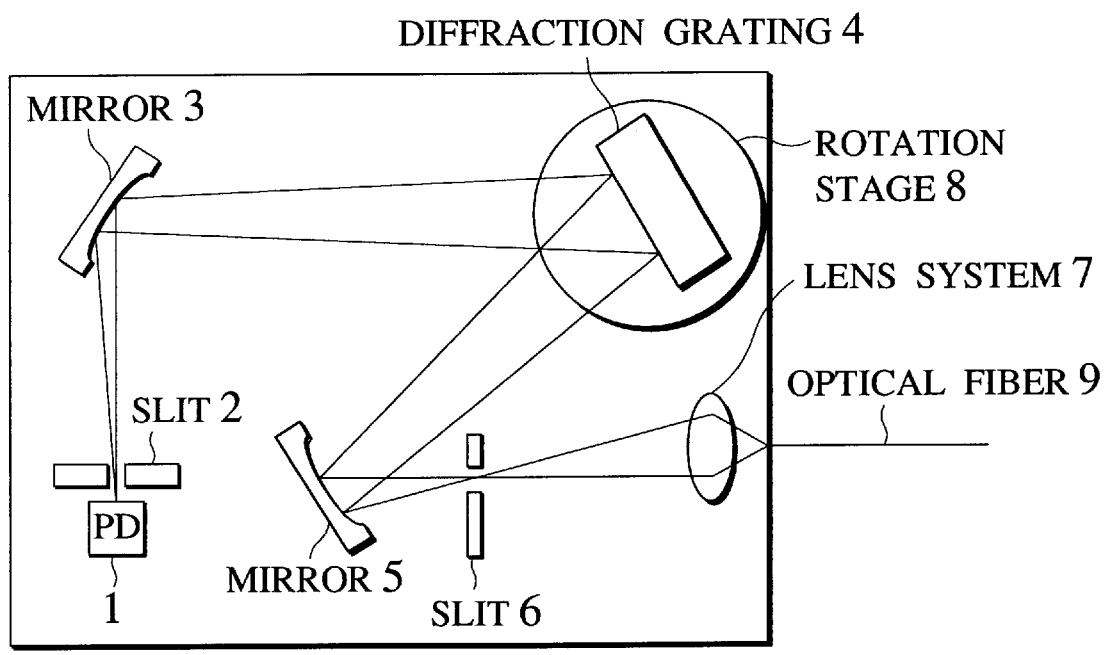
FIG. 1 is a schematic diagram showing a configuration of a conventional monochrometer.
Figure 2:
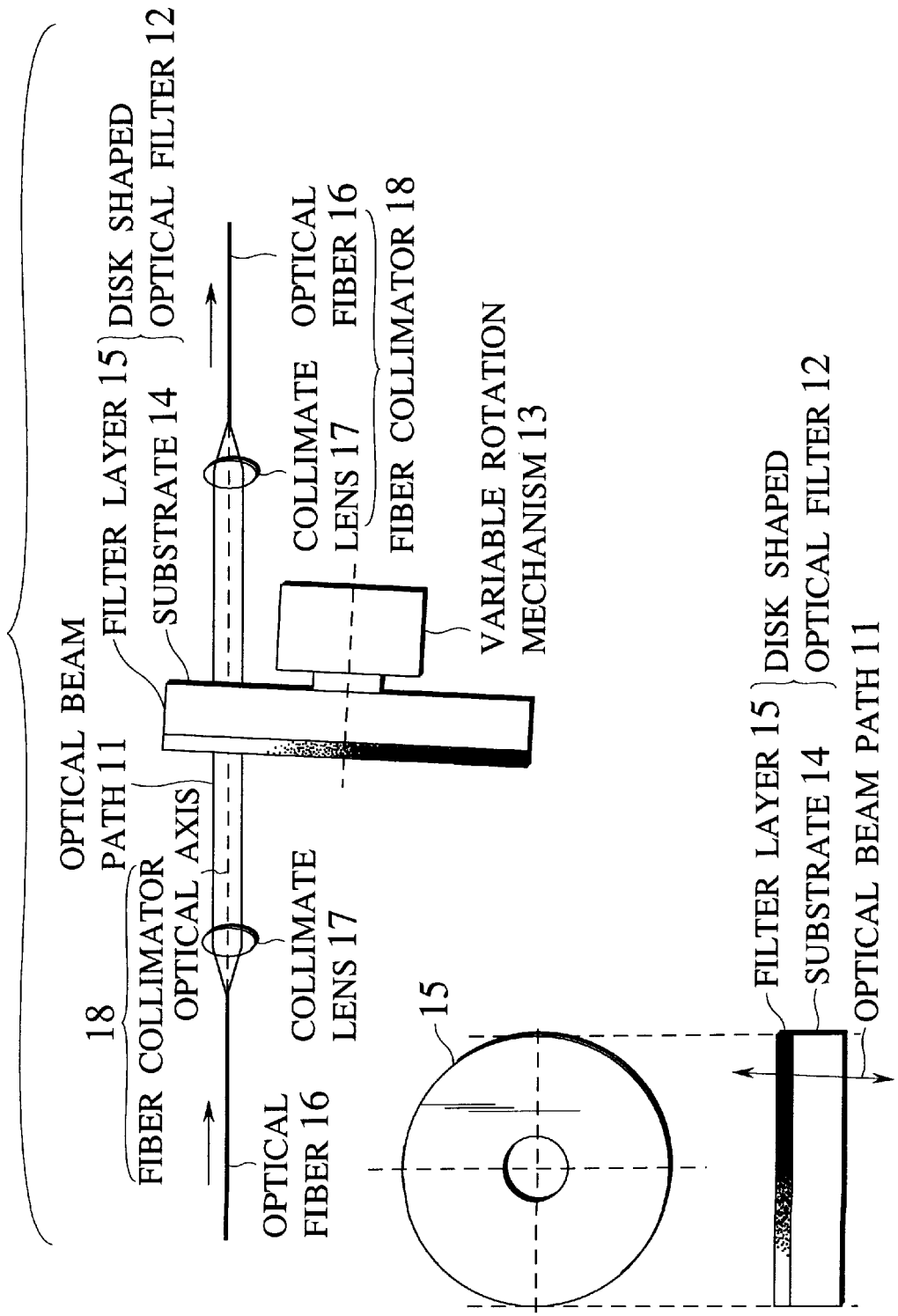
FIG. 2 is a diagram showing a basic configuration of a high speed wavelength discrimination apparatus according to the first embodiment of the present invention.

FIG. 2 shows a basic configuration of the high speed wavelength discrimination apparatus in this first embodiment, which comprises a disk shaped optical filter 12 having such a filter characteristic that the transmission central wavelength varies along a circumferential direction, which is positioned on an optical beam path 11 of collimated lights, and a variable rotation mechanism 13 for rotating the optical filter 12 at high speed in synchronization with external signals. In this first embodiment, a disk rotation mechanism is adopted for the variable rotation mechanism 13 in order to eliminate the mechanical limitation on the maximum number of rotations.

Note that, in FIG. 2, the disk shaped optical filter 12 is arranged to be slightly inclined from a direction perpendicular to an optical axis of the optical beam path 11 (a vertical direction of the optical axis), but the present invention is not necessarily limited to this arrangement, and it is possible to arrange the disk shaped optical filter 12 along the direction perpendicular to the optical axis (the vertical direction of the optical axis). When the disk shaped optical filter 12 is arranged to be slightly inclined from the vertical direction of the optical axis as shown in FIG. 2, there is an advantage that an incident light will not be directly reflected back to the incident side. In such a case, it is preferable to set this inclination to be about several radians in view of a relationship with the filter characteristic.

Note that the high speed rotations of a disk are already demonstrated by the optical disk device and the hard disk device, and about 7000 rpm (117 Hz) is currently realizable in practice. Furthermore, unlike the existing disk devices which are subjected to a limitation due to memory capacity, the optical filter 12 of the present invention has essentially no limitation on a disk diameter so that it is also possible to further pursue the conditions for realizing high speed rotations.

The disk shaped optical filter 12 comprises a substrate 14 in a form of a quartz disk, and a filter layer 15 with transmission central wavelengths varying along a circumferential direction which is provided on the substrate 14, in order to realize the wavelength discrimination. The filter layer 15 is formed by the usual dielectric multi-layer. The wavelength discrimination range and bandwidth are determined by the configuration of this filter layer 15.

Here, the quartz is used for the substrate 14 on which the filter layer 15 is to be formed, because of its high transparency, its high reliability with respect to high speed rotations based on its high mechanical strength, and its excellent stability against temperature. A disk surface of the substrate 14 facing toward the variable rotation mechanism 13 side that is on opposite side of the filter layer 15 is applied with a wide bandwidth antireflection coating.

In FIG. 2, fiber collimators 18 each comprising an optical fiber 16 and a collimate lens 17 are arranged face to face and the disk shaped optical filter 12 is inserted in the optical beam path 11 formed between the fiber collimators 18 such that lights pass through the disk shaped optical filter 12.

There is a need to make the beam diameter sufficiently small so as not to degrade the filter characteristic, but the usual collimate beam has a beam diameter of 300 μm which is sufficiently small with respect to a disk of 2.5 inches diameter so that this condition can be satisfied. Also, with this beam diameter it is possible to propagate the optical beam through about 60 mm of space under the condition of the coupling loss being 0.5 dB or less, so that it suffices to realize the configuration shown in FIG. 2.

Using the disk shaped optical filter 12 shown in FIG. 2, it is possible to realize a wavelength discrimination apparatus in which the transmission central wavelength varies continuously over a wide bandwidth. In particular, by forming the filter layer 15 such that the transmission central wavelength varies linearly along the circumferential direction, it is possible to realize the wavelength discrimination in synchronization with a timing requested from a system at arbitrary central wavelength variation rate, using the number of rotations control and the conventional electric synchronization technique.

For example, when multiple wavelength continuous optical beams arranged at equal wavelength interval are incident on this wavelength discrimination apparatus, the incident lights can be converted into output lights in forms of a series of pulse lights arranged at equal interval on a time axis. This amounts to the conversion between the wavelength axis and the time axis so that it becomes possible to realize the measurement of absolute wavelengths on the time axis provided that absolute wavelengths corresponding to the multiple wavelengths of the incident lights are calibrated.

Now three specific configurations of a high speed wavelength discrimination apparatus according to the first embodiment will be described.

Figure 3:
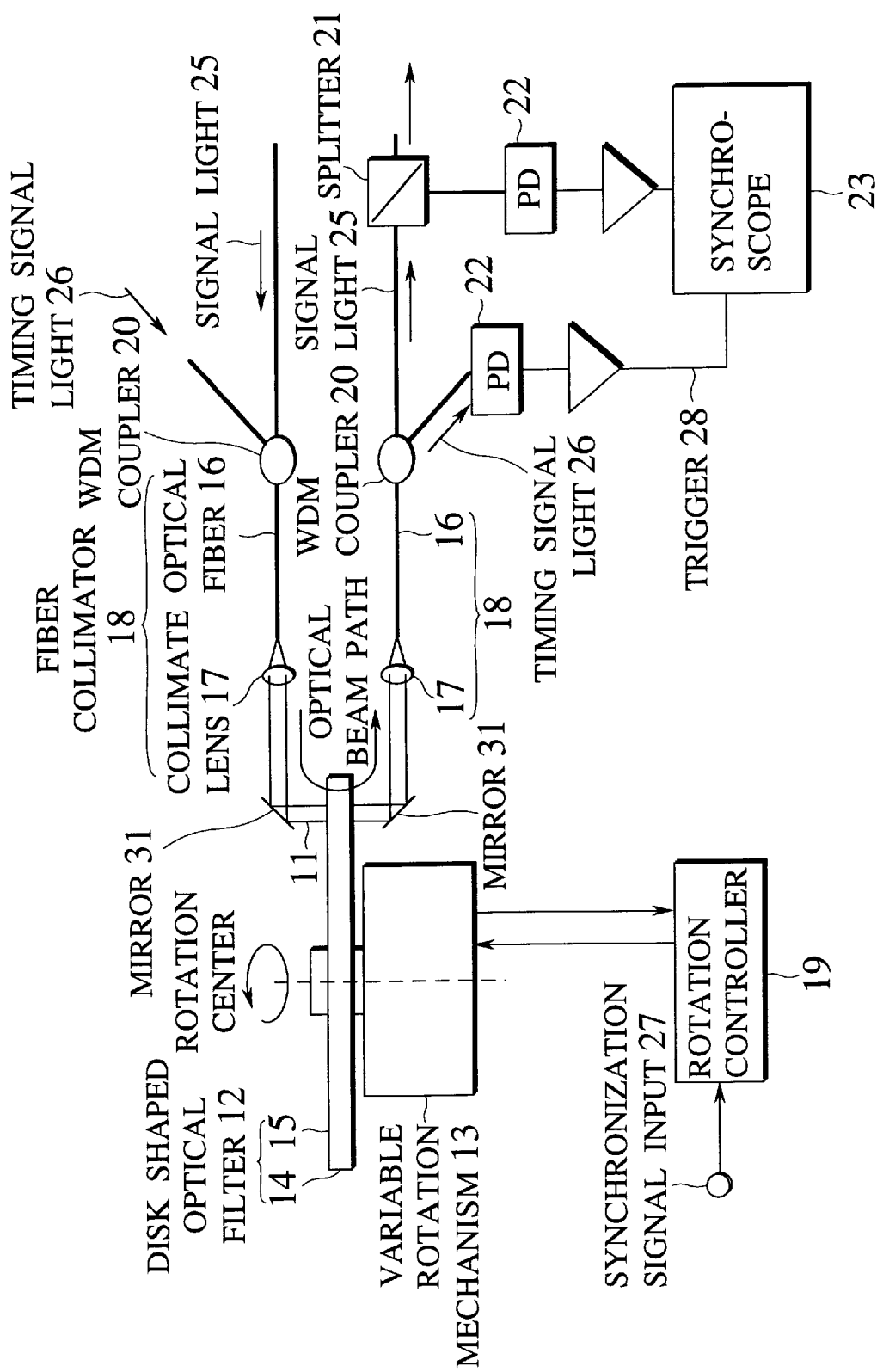
FIG. 3 is a block diagram showing a specific configuration of a first high speed wavelength discrimination apparatus according to the first embodiment of the present invention.

FIG. 3 shows a configuration of a first high speed wavelength discrimination apparatus according to the first embodiment, which comprises a disk shaped optical filter 12 formed by a quartz disk 14 and a filter layer 15 which is placed in an optical beam path 11, a variable rotation mechanism 13 connected to the disk shaped optical filter 12, a rotation controller 19 for controlling the variable rotation mechanism 13 according to synchronization signal input 27, fiber collimators 18 each formed by an optical fiber 16 and a collimate lens 17 between which the optical beam path 11 is formed, WDM (Wavelength Division Multiplexing) couplers 20 for coupling an input timing signal light 26 and an input signal light 25 into an input side fiber collimator 18 and decoupling an output signal light 25 and an output timing signal light 26 from an output side fiber collimator 18, a splitter 21 for splitting the output signal light 25, photo-detectors (PD) 22 for converting the output timing signal light 26 from the WDM coupler 20 and the output signal light 25 from the splitter 21 into electric signals, and a synchroscope 23 receiving electric signals from the photo-diodes 22 including a trigger signal 28 obtained from the output timing signal light 26, and mirrors 31 for forming the optical beam path 11 that passes through the disk shaped optical filter 12 from its top side to its bottom side.

In the configuration of FIG. 3, the disk shaped optical filter 12 has the transmission central wavelengths that are varying linearly along the circumferential direction so that the wavelength axis can be directly converted into the time axis under the condition of constant rotations that can be realized by the phase comparison using an output of a rotary encoder or the like that monitors the number of rotations and a master clock or the like. Consequently, the high speed wavelength discrimination becomes possible by providing the master clock and synchronizing the rotation system and the measurement system (photo-diodes 22 and the synchroscope 23) to the master clock. The time axis is immediately converted into the wavelength axis according to a central wavelength shift per unit rotation angle that was measured in advance in a stationary system.

Figure 4A:
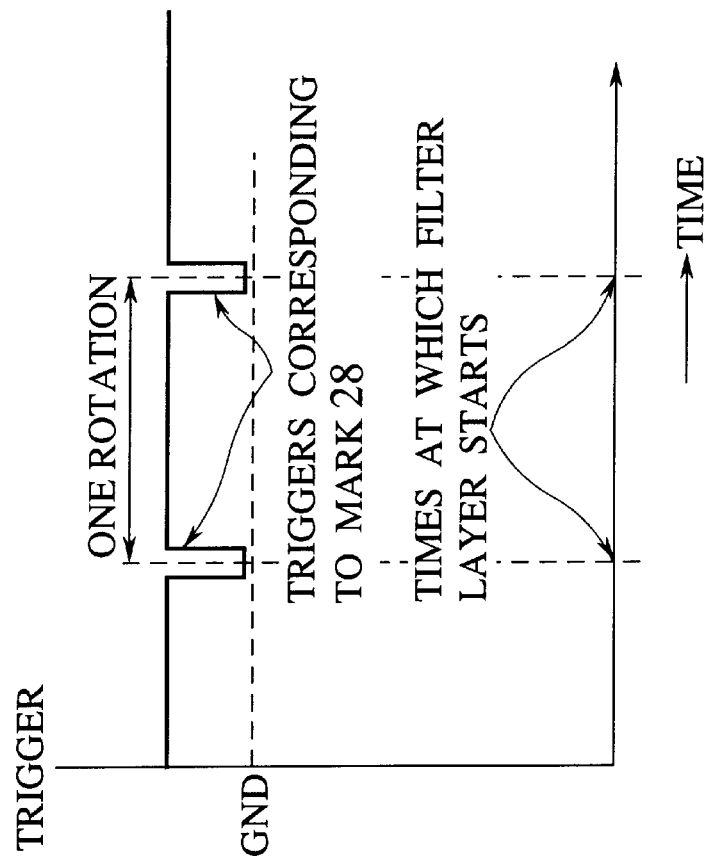
FIG. 4A is a diagram showing a timing detection mark provided on a disk shaped optical filter in the first high speed wavelength discrimination apparatus of FIG. 3.
Figure 4B:
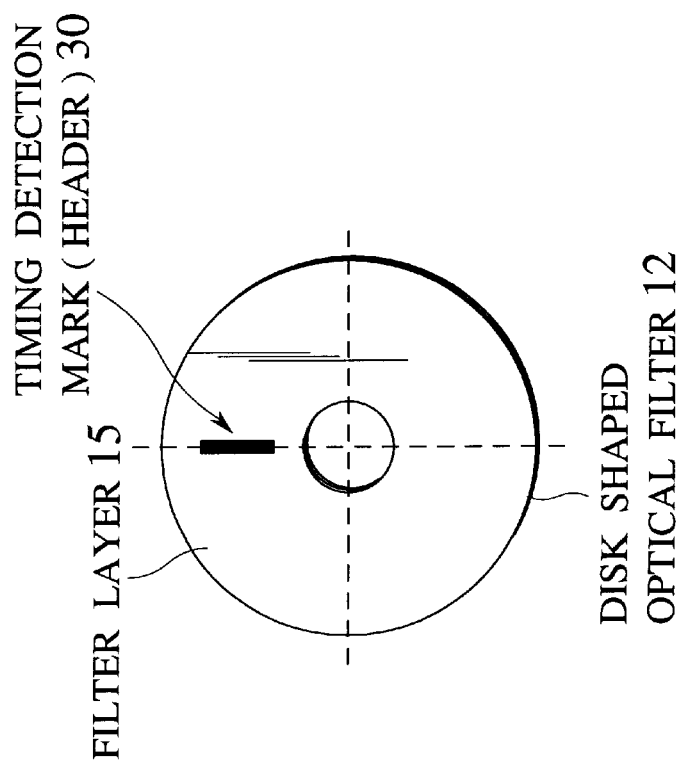
FIG. 4B is a timing chart showing a procedure of the start timing detection according to the timing detection mark shown in FIG. 4A.

Here, the key issue is the detection of a timing of a filter layer starting portion, because the conversion of wavelength axis into time axis becomes impossible unless this timing is detected. In order to make this timing detection possible, a timing detection mark (header) 30 is attached at the starting portion of the filter layer 15 as shown in FIG. 4A, such that the start timing can be detected by detecting a timing at which the collimated beam passes this header 30 as indicated in FIG. 4B.

In the configuration of FIG. 3, the timing signal light 26 with a wavelength different from that of the signal light 25 is entered at the input side WDM coupler 20 and extracted at the output side WDM coupler 20 after passing through the filter, such that the timing extraction can be realized without affecting the signal light 25.

Note that, in the configuration of FIG. 3, a compact configuration is realized by adopting a collimating system in which the optical axis is changed by the mirrors 31.

Figure 5:
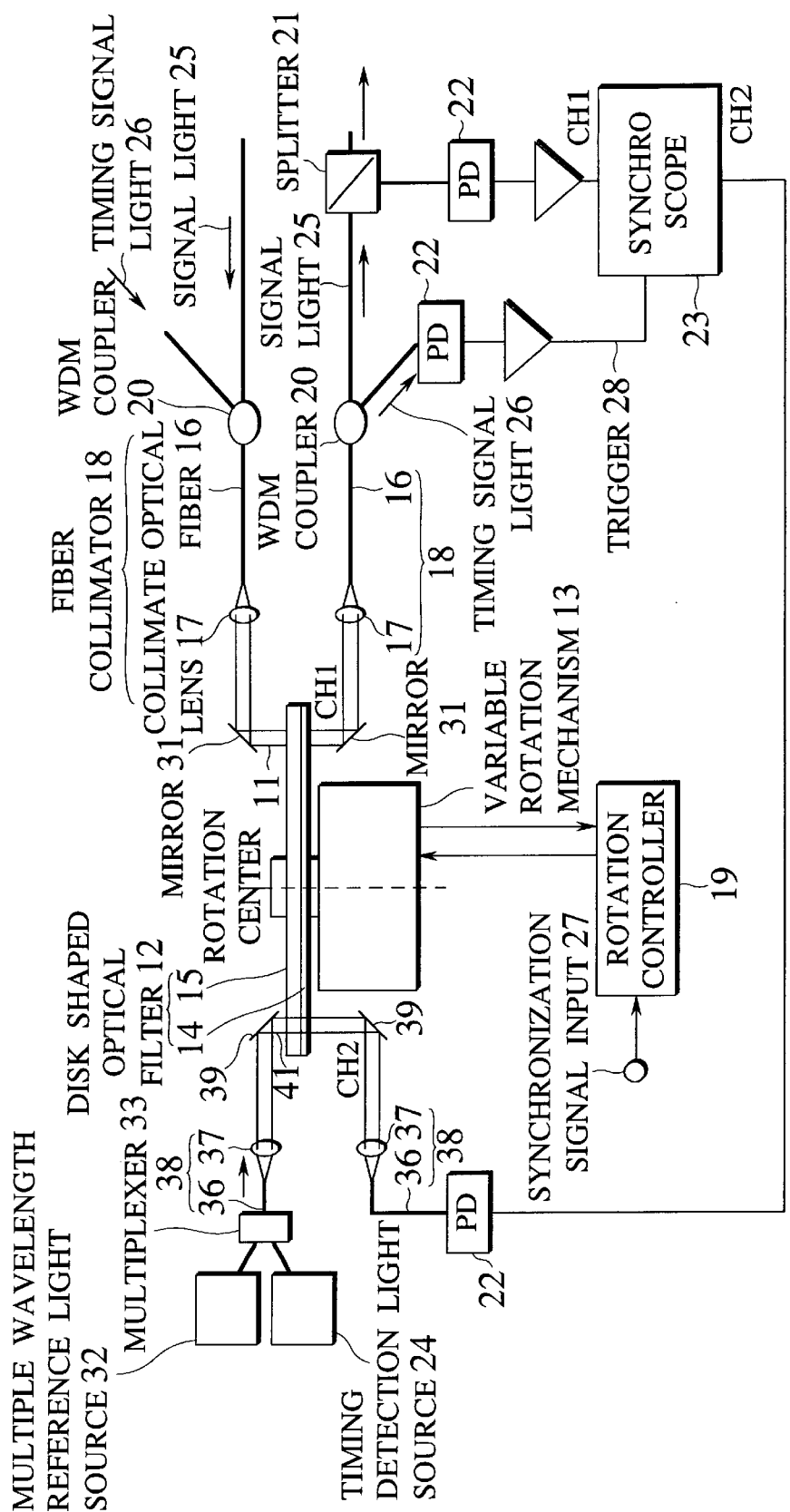
FIG. 5 is a block diagram showing a specific configuration of a second high speed wavelength discrimination apparatus according to the first embodiment of the present invention.

FIG. 5 shows a configuration of a second high speed wavelength discrimination apparatus according to the first embodiment, in which the configuration similar to that of FIG. 3 described above is provided as a channel-1 (CH1). In addition, the configuration of FIG. 5 further includes a channel-2 (CH2) formed by a multiple wavelength reference light source 32, a timing detection light source 24, a combiner 33 for combining the multiple wavelength reference lights from the multiple wavelength reference light source 32 and a timing detection light from the timing detection light source 24, fiber collimators 38 each formed by an optical fiber 36 and a collimate lens 37 between which an optical beam path 41 is formed, mirrors 39 for forming the optical beam path 41 that passes through the disk shaped optical filter 12 from its top side to its bottom side, and another photo-detector (PD) 22 for converting the CH2 output lights into electric signals and supplying the obtained electric signals to the synchroscope 23. Here, the collimating system of the channel-2 is provided in parallel to the collimating system of the channel-1.

In the configuration of FIG. 5, the disk shaped optical filter 12 has the transmission central wavelengths that are varying nonlinearly along the circumferential direction. Here, however, it is assumed that the transmission central wavelengths varies not randomly but according to a smooth monotonic function.

Figure 6:
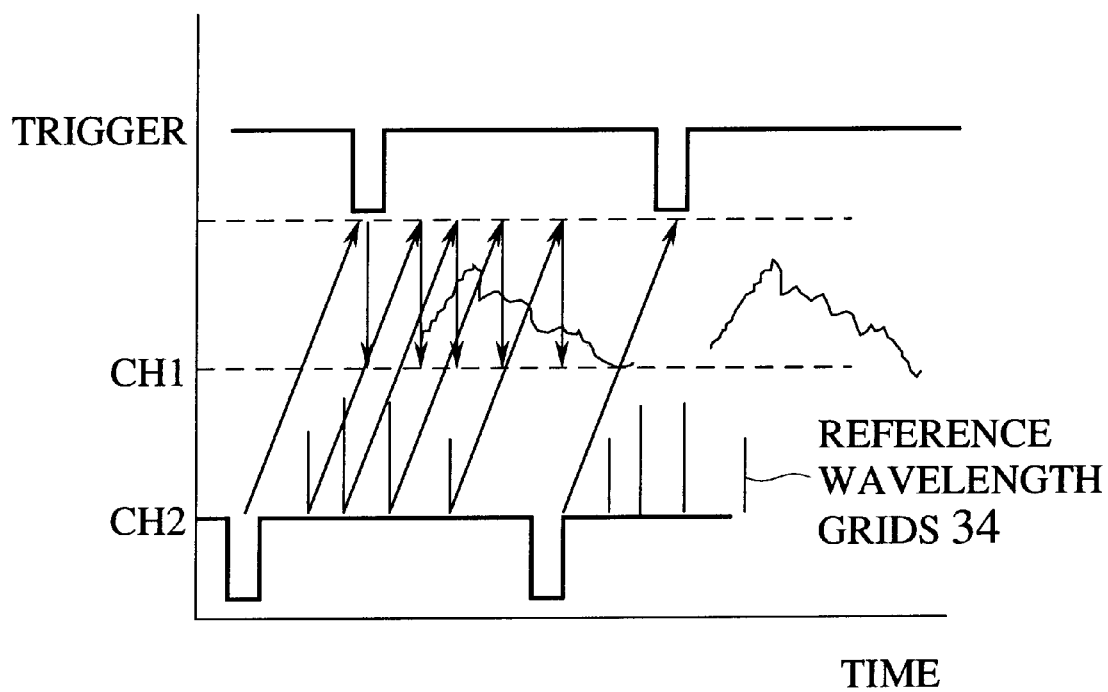
FIG. 6 is a timing chart showing a procedure of the calibration based on reference wavelength grids used in the second high speed wavelength discrimination apparatus of FIG. 5.

When such a filter characteristic is used, it is impossible to convert the wavelength axis into the time axis by simply detecting the start timing so that it is impossible to realize a good wavelength discrimination characteristic. For this reason, in the configuration of FIG. 5, the channel-2 is provided in order to form reference grids 34 on the time axis as shown in FIG. 6, and the wavelengths are calibrated according to the reference grids 34.

More specifically, the multiple wavelength reference lights are entered into the channel-2, and the transmitted light intensity signal is detected by the photo-detector 22. Then, intensity peaks corresponding to the reference lights with wavelengths $\lambda_1, \lambda_2, \lambda_3, \ldots$ are detected at times $t_1, t_2, t_3, \ldots$. Then, using these detected peaks as the reference grids 34, the relationship between the wavelength and the times are obtained by interpolation. With this calibration, the transmission central wavelength can be obtained in terms of the time by the following equation (1):

$$\lambda c = \lambda(t) \tag{1}$$

where t is a relative time within one period of the disk rotation that is measured by setting a time corresponding to the mark on the disk as an origin.

When the time required for the mark on the disk to be rotated from the beam passing position of the channel-2 to the beam passing position of the channel-1 is $\Delta\tau$ (in which case the viewing angle between the channel-1 and the channel-2 will be $\omega\Delta\tau$ where $\omega$ is an angular velocity), the transmission central wavelength of the signal light passing in the channel-1 will be given by the following equation (2).

$$\lambda c = \lambda(t - \Delta\tau) \tag{2}$$

Figure 7:
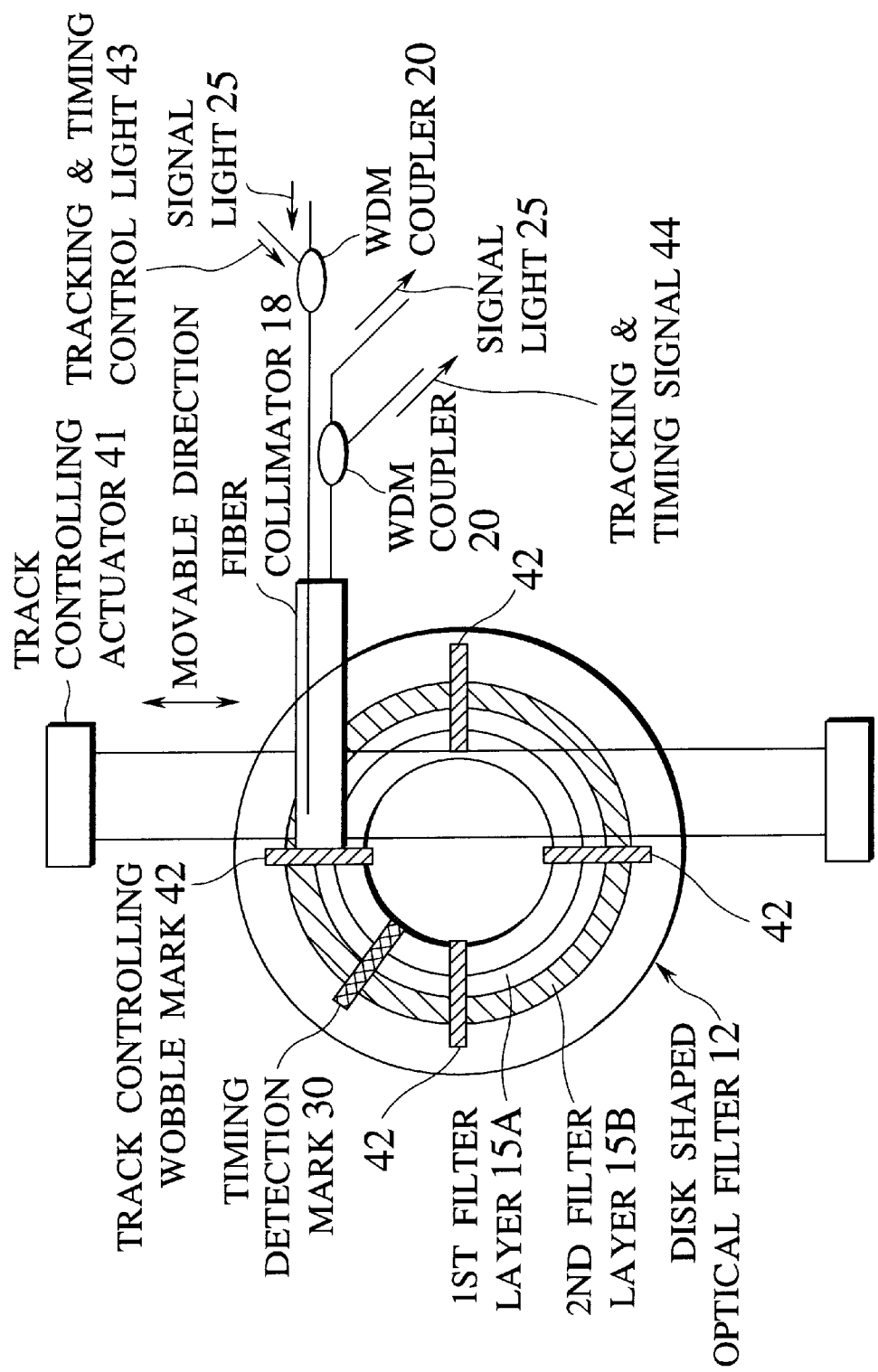
FIG. 7 is a block diagram showing a specific configuration of a third high speed wavelength discrimination apparatus according to the first embodiment of the present invention.

FIG. 7 shows a configuration of a third high speed wavelength discrimination apparatus according to the first embodiment, which corresponds to the case of realizing the wavelength discrimination by changing the filter characteristic such as bandwidth and the wavelength range. It is possible to realize the same by exchanging disks, but the configuration of FIG. 7 is practically quite useful because it is possible to realize the function of the optical spectrum analyzer for realizing measurement while changing the resolution.

In the configuration of FIG. 7, the disk shaped optical filter 12 has mutually different first filter layer 15A and second filter layer 15B that are arranged concentrically on the substrate.

As a mechanism for selecting one of these two filter layers, the track and servo mechanism used in the conventional optical disk can be utilized. Namely, the seek and tracking operation is carried out by a track controlling actuator 41 that is controllable in a radial direction, to which the fiber collimators 18 similar to those of the configuration of FIG. 3 are attached. In order to maintain the track, the conventionally known sample and servo technique can be utilized. In this way, it is possible to realize the tracking without leaving a tracking groove on the filter layer, so that it is possible to prevent the degradation of the wavelength discrimination characteristic.

Figure 8:
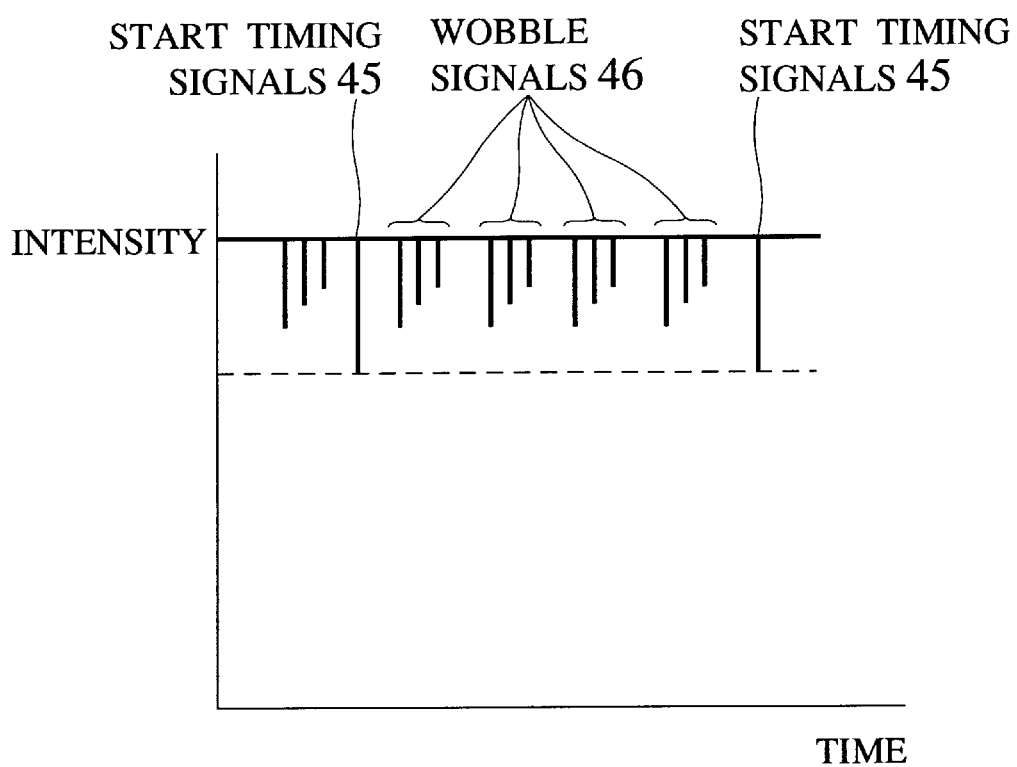
FIG. 8 is a timing chart showing start timing signals and wobble signals used in the third high speed wavelength discrimination apparatus of FIG. 7.

Also, in the configuration of FIG. 7, the disk shaped optical filter 12 is provided with four track controlling wobble marks 42. Here, the tracking width of several tens of microns is sufficient and the high speed controlling of the actuator is unnecessary. When a tracking and timing control light 43 is entered at the input side WDM coupler 20, the tracking and timing signal 44 from the output side WDM coupler 20 has an exemplary waveform as shown in FIG. 8, which contains start timing signals 45 due to the timing detection mark 30 and wobble signals 46 due to the track controlling wobble marks 42.

As described, according to the first embodiment, it is possible to realize the high speed wavelength discrimination by a very simple configuration. This wavelength discrimination mechanism can be utilized in reducing size and cost of the conventional optical spectrum analyzer considerably, or in realizing discrimination of wavelength multiplexed lights synchronized with a system.

Referring now to FIG. 9 to FIG. 14, the second embodiment of the present invention will be described in detail. This second embodiment is directed to a reference wavelength light generation apparatus according to the present invention.

Figure 9:
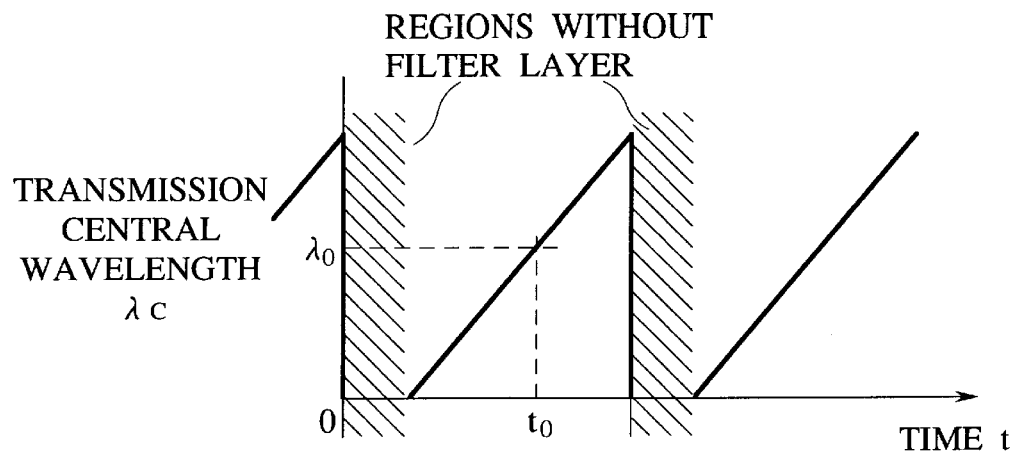
FIG. 9 is a graph showing a time change of the transmission central wavelength of a disk shaped optical filter used in a reference wavelength light generation apparatus according to the second embodiment of the present invention.

In this second embodiment, in controlling the oscillation wavelength of Distributed Feed-Back Laser Diode (DFB-LD), the transmission wavelength of the disk shaped optical filter similar to that of the first embodiment described above will be utilized. This disk shaped optical filter has a characteristic that the transmission central wavelength of an optical beam that passes through it depends on linearly on an angular position, so that the transmission central wavelength varies with respect to time as shown in FIG. 9 when the disk shaped optical filter is rotated at a constant rotation speed.

When this disk shaped optical filter is rotated in synchronization with electric signals, the time axis with respect to which the transmission central wavelengths are given will be converted into the wavelength axis such that the oscilloscope waveform (temporal waveform) of the transmission light intensity will indicate the optical spectrum.

In the case of handling two or more appropriate reference light sources whose difference is to be obtained, for example, on the wavelength axis, these reference light sources can be calibrated on this equivalent wavelength axis, and a relative time $t_0$ within a rotation period which gives the transmission central wavelength coinciding with the specified wavelength $\lambda_0$ can be derived on the calibrated wavelength axis.

Using the transmission characteristic $\rho(\lambda, \theta)$ of the disk shaped optical filter, the Lorentz type profile $u(\lambda)$, for example, of the incident light, and the rotation angle $\theta = \omega t$, the temporal waveform can be given by the following equation (3).

$$i\,P(t) = \int \rho(\lambda, \omega t) u(t) d\lambda \tag{3}$$

where $\lambda$ is the wavelength and t in $\omega t$ is a relative time within one rotation period.

On the other hand, the spectrum of DFB-LD has a half-width which is very much narrower than that of the disk shaped optical filter so that it can be expressed as $\delta(\lambda - \lambda_x)$ by using the delta function, and when the integration of the above equation (3) is carried out, the temporal waveform of the intensity of light that passed through the filter will reflect the transmission characteristic of the filter.

Figure 10:
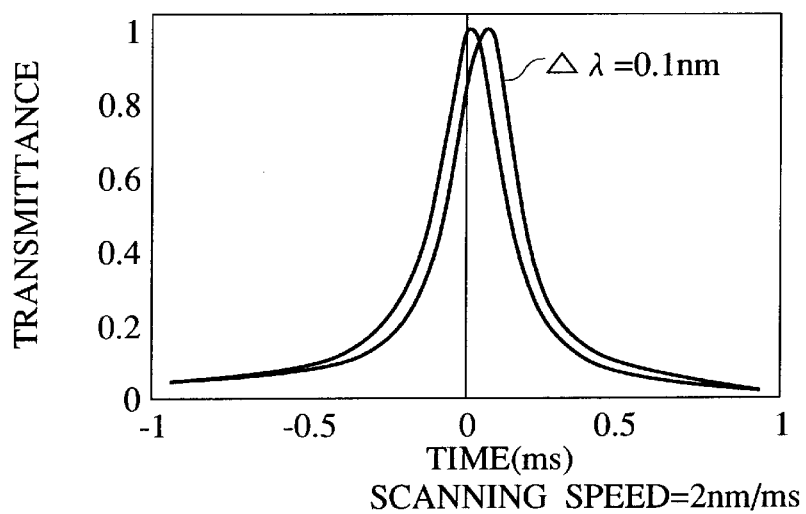
FIG. 10 is a graph showing an exemplary temporal waveform in the reference wavelength light generation apparatus according to the second embodiment of the present invention.

FIG. 10 shows an exemplary temporal waveform, which is the waveform with respect to two laser beams with the oscillation wavelengths $\lambda_x = \lambda_0$, $\lambda_0 + 0.1$ (nm) in the case of using the Lorentz type filter with the half-width of 0.5 nm. The scanning speed is 2 nm/ms, which is the speed that can be obtained by the rotations of the disk with 25 inches diameter at about 150 rpm.

Figure 11:
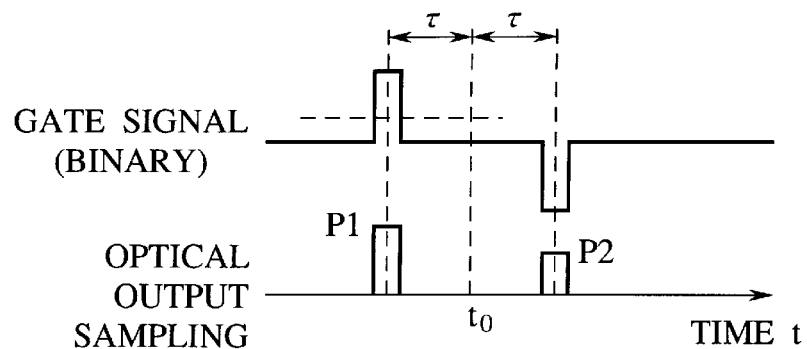
FIG. 11 is a timing chart indicating sampling timings in the reference wavelength light generation apparatus according to the second embodiment of the present invention.

Consequently, as shown in FIG. 11, by sampling optical outputs $P_1$ and $P_2$ according to the above equation (3) by applying gate signals at the times $t = \tau, -\tau$ that are equidistanced from the reference time $t_0$, the light intensity can be expressed by the following equation (4) in the case of Lorentz type filter.

$$P(t) = \frac{1}{1 + r((\lambda(t) - \lambda_x)/\Delta\lambda)^2} = \frac{1}{1 + 4((a\omega t + \lambda_0 - \lambda_x)/\Delta\lambda)^2} \quad (4)$$

where $\Delta\lambda$ is the half-width of the filter, $\lambda_x$ is the oscillation wavelength of the laser diode, $\omega$ is the angular velocity of the disk, and a is a shift of the transmission central wavelength in the disk shaped optical filter per unit angle.

Consequently, the sampled optical output difference will be given by the following equation (5).

$$\Delta P = P_1 - P_2 \quad (5)$$
$$= \frac{16}{\Delta\lambda} \cdot \frac{a\omega\tau(\lambda_x - \lambda_0)}{1 + 4(\lambda_0 + a\omega\tau - \lambda_x)/\Delta\lambda)^2))(1 + 4((\lambda_0 - a\omega\tau - \lambda_x)/\Delta\lambda)^2))}$$

When the wavelength difference is small, the optical output difference is approximately proportional to the wavelength difference, and the sign indicates a direction of deviation of the wavelength.

Figure 12:
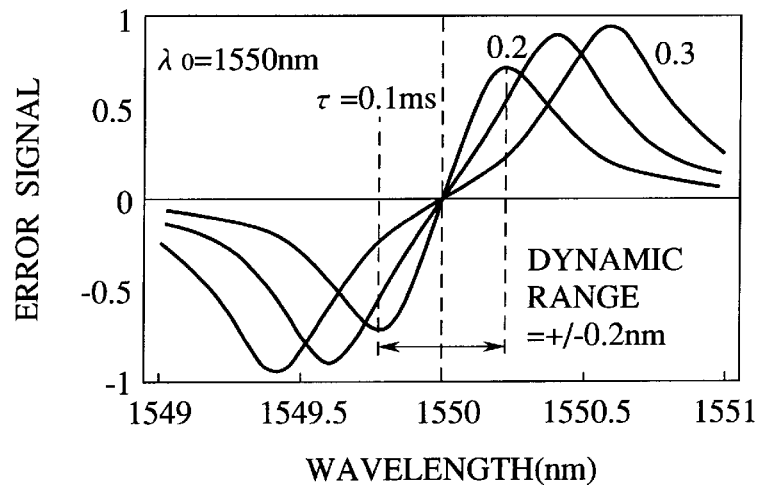
FIG. 12 is an error curve obtained in the reference wavelength light generation apparatus according to the second embodiment of the present invention.

FIG. 12 shows an error curve obtained by plotting the optical output difference as a function of deviation of the wavelength in the case of characteristic shown in FIG. 10, where it can be seen that the linear error signals can be obtained in a vicinity of the reference time (t=0 here) by setting gate timings appropriately so that the wavelength control is possible. This control region (dynamic range) is ±0.2 nm when τ=0.1 ms, and the wavelength can be controlled very accurately within this range, which is much smaller than the half-width of the filter.

Figure 13:
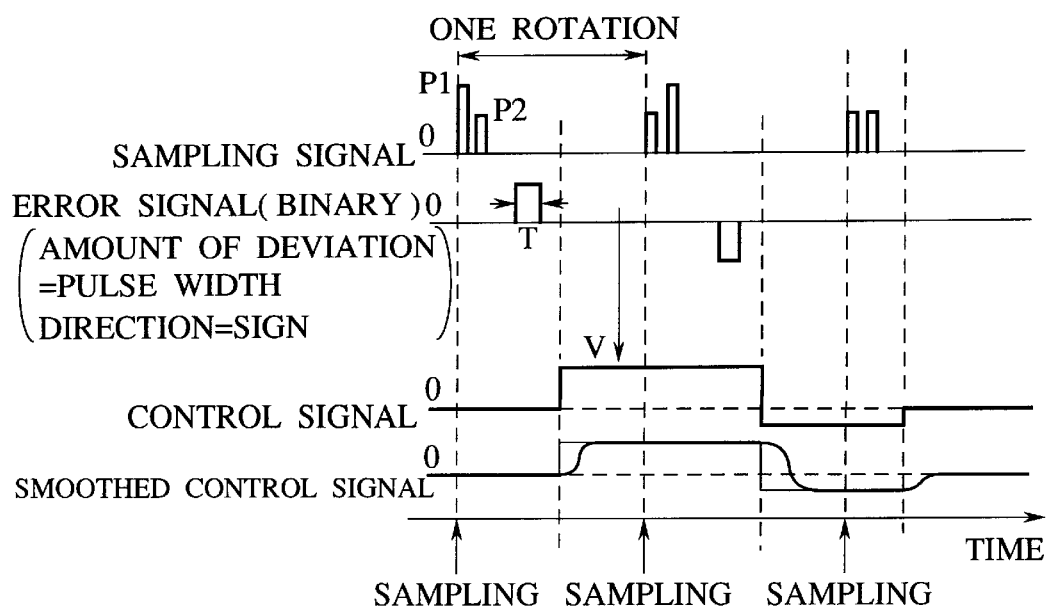
FIG. 13 is a timing chart for various signals used in the reference wavelength light generation apparatus according to the second embodiment of the present invention.

FIG. 13 shows a timing chart for various signals at a time of control, where the sampling is carried out for each disk rotation and a period in a range of 10 Hz to 200 Hz is available as the sampling time. This corresponds to the fact that the disk is utilized with the rotation speed in a range of 600 rpm to 3000 rpm.

The sampled outputs $P_1$, $P_2$ are calculated by the above equation (4), and the amount of deviation is expressed as a time width and the direction is expressed as a sign by the above equation (3). The oscillation wavelength control signal V of the laser diode is generated from this output signal, and this control signal is held within one sampling period. In order to prevent the noise excitation of the laser diode due to abrupt change of the control signal, the control signal is smoothed by an appropriate circuit. By making the rotation speed of the disk sufficiently high and the sampling period short, it is possible to realize the sample servo wavelength control in which the drift of the laser oscillation wavelength is suppressed.

Figure 14:
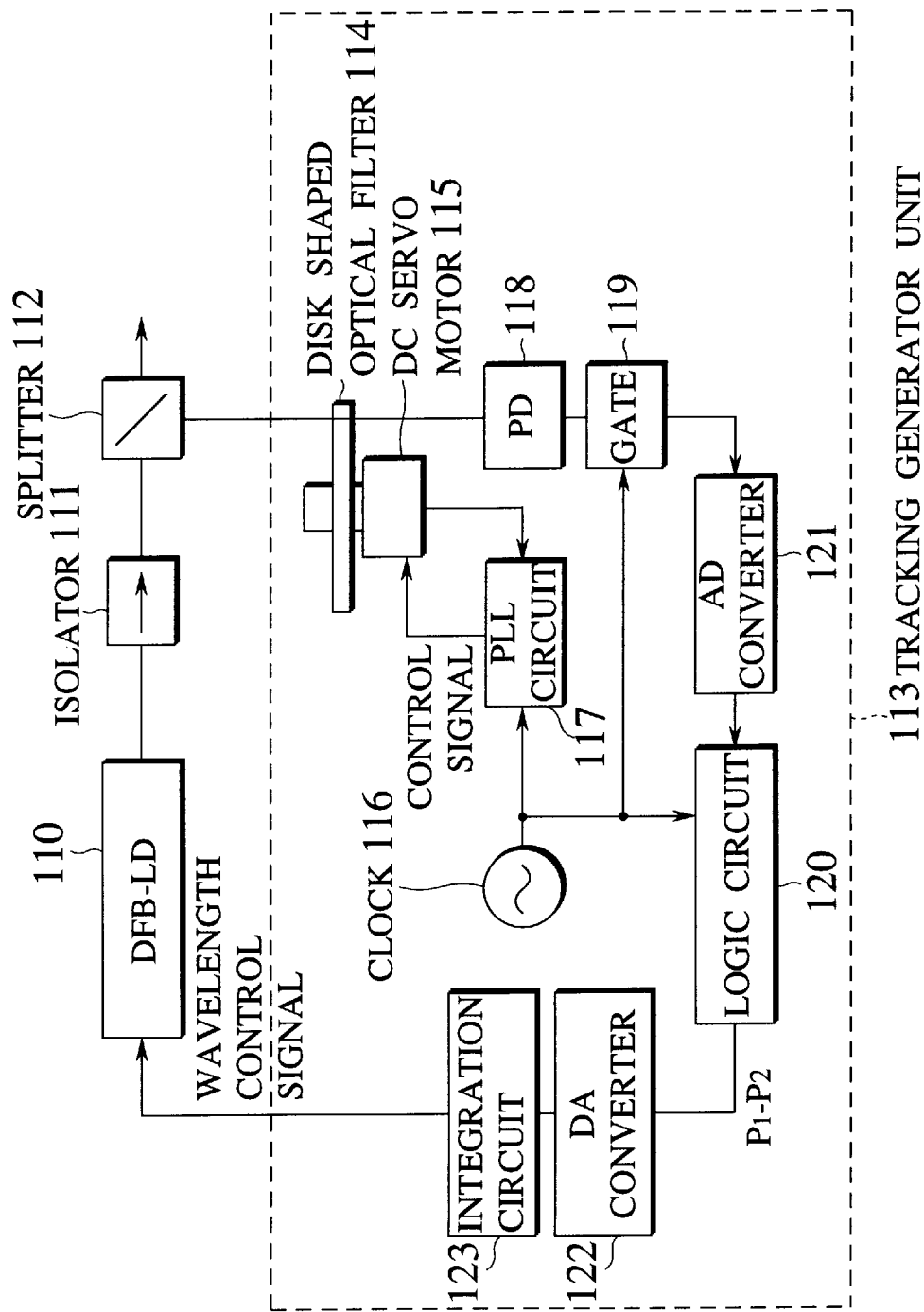
FIG. 14 is a block diagram showing an exemplary configuration of the reference wavelength light generation apparatus according to the second embodiment of the present invention.

In the case of using the characteristic of the disk shaped optical filter, the temporal waveform, the gate signals, the control signals, etc., as described above, a reference wavelength light generation apparatus of this second embodiment can have an exemplary configuration as shown in FIG. 14. In the configuration of FIG. 14, the output of a DFB-LD 110 is entered into an isolator 111 and then partially split by the splitter 112 and entered into a tracking generator unit 113. In this case, the multiple electrode type distributed feed-back laser diode can be used as the DFB-LD 110, which controls the selection wavelength by controlling the carrier concentration at a diffraction grating section while also carrying out a phase compensation, and which has a tunable range of about 30 nm in the monolithic structure.

The split optical beam entered from the splitter 112 to the tracking generator unit 113 is converted into collimated optical beam, and an disk shaped optical filter 114 with the varying transmission central wavelength provided thereon is placed in the collimated optical beam path. This disk shaped optical filter 114 is driven by a DC servo motor 115, where the motor driving is carried out while clocks from a clock generator 116 are phase synchronized by a PLL (Phase Locked Loop) circuit 117 for the purpose of stabilizing rotational phase.

The transmitted lights of the disk shaped optical filter 114 are entered into a photo-diode (PD) 118 and converted into electric signals, and these electric signals are sampled by applying gates at a gate circuit 119.

At a time of sampling, the time to corresponding to the reference wavelength is calculated by taking a mark attached on the disk shaped optical filter 114 as a reference point, and two gates are set up before and after this reference time. There is also provided a logic circuit 120 in order to derive a difference between electric signals corresponding to two transmitted lights that are sampled by opening the gates. In this logic circuit 120, the optical output difference $P_1-P_2$ is calculated. Here, the output is given in a form of a pulse with a pulse width equal to the absolute value of the optical output difference and a sign equal to the direction, as shown in FIG. 13.

There is also provided an AD converter 121 in front of the logic circuit 120 in order to carry out the digital processing in which the delay compensation for the time delay between two samplings can be realized more easily than the analog processing.

There is also provided a DA converter 122 behind the logic circuit 120, which generates a control signal with respect to the wavelength tunable DFB-LD 110 using the analog conversion. This control signal is held until the next timing signal is entered by the clock 116.

There is also provided an integration circuit 123 for the purpose of smoothing the control signal which changes like a step function. Here, the circuit constant is optimized according to the sampling time interval and the laser diode characteristic. By controlling the DFB-LD 110 with this control signal, it becomes possible to obtain the continuous monochromatic light of the reference wavelength according to the reference wavelength grids.

As described, according to the second embodiment, it is possible to obtain arbitrary good continuous monochromatic light according to the reference wavelength grids by an apparatus in a compact size, without requiring a long optical beam path and a high rigidity frame.

Referring now to FIG. 15 to FIG. 20, the third embodiment of the present invention will be described in detail. This third embodiment is directed to an optical packet generation apparatus according to the present invention.

Figure 15:
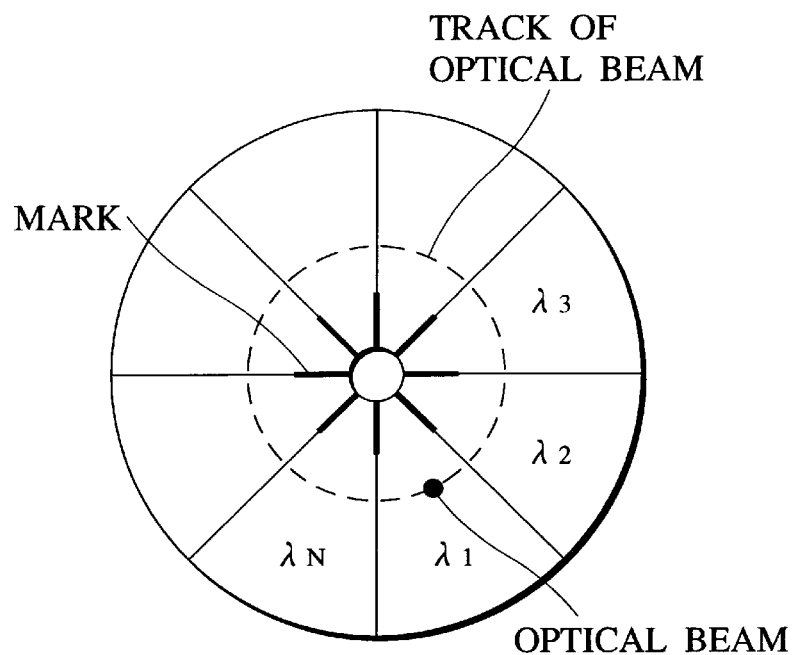
FIG. 15 is a diagram showing a disk shaped optical filter used in an optical packet generation apparatus according to the third embodiment of the present invention.
Figure 16:
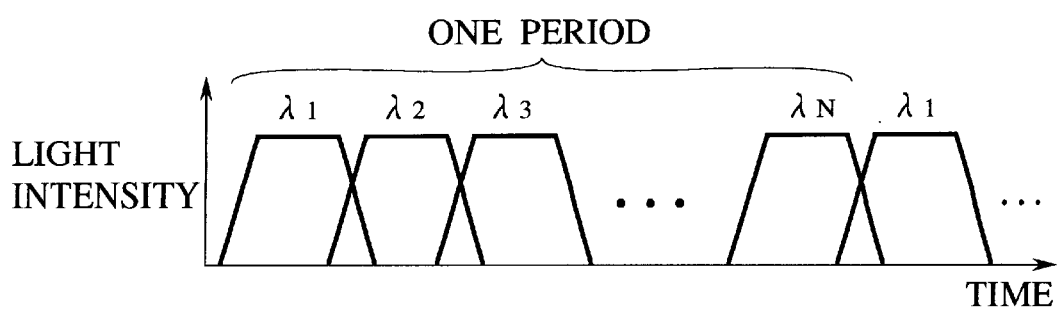
FIG. 16 is a diagram showing optical packets generated by the optical packet generation apparatus according to the third embodiment of the present invention.

The optical packet generation apparatus of this third embodiment uses a disk shaped optical filter in which dielectric multi-layer optical filter layers of prescribed transmission wavelengths are formed on a plurality of fan-shaped regions dividing the disk at prescribed central angles, as shown in FIG. 15. Here, the transmission wavelengths of the dielectric multi-layer optical filter layers of the respective regions are assumed to be $\lambda_1$ to $\lambda_N$. This optical filter is rotated while continuous lights with a plurality of wavelengths coinciding with the transmission wavelengths are incident on the disk. Then, the transmission positions of the incident optical beams sequentially pass through regions with different transmission wavelengths along a track indicated by a dashed line in FIG. 15. On the other hand, the wavelengths of the incident optical beams are coincident with the transmission wavelengths, so that only the optical beam of a single wavelength is selectively transmitted at each region. In this way, the monochromatic pulse lights with wavelengths corresponding to the transmission wavelengths of the respective regions will be outputted in time series in conjunction with the rotations of the optical filter, as shown in FIG. 16. Namely, the N channel optical pulses with different wavelengths for different channels are outputted in the time division multiplexed form.

Also, as shown in FIG. 15, a plurality of marks are formed at constant central angles radially from the central portion of this disk shaped optical filter. By detecting these marks and providing feed-back to the rotation driving section of the optical filter, it is possible to control the number of rotations of the optical filter. Note that, in FIG. 15, the marks are formed at borders between the regions with different transmission wavelengths, but their number and positions are arbitrary as long as the central angle between each adjacent marks is constant. Note however that it is possible to control the number of rotations of the optical filter at higher precision by increasing the number of marks.

Also, by locking the phases of the detection signals that are generated when the marks on the rotating optical filter are detected with the phases of external control signals, it is possible to generate the optical packets with a constant pulse width in synchronization with the external signals.

In addition, by detecting one rotation of the optical filter or the regions with different transmission wavelengths using the prescribed marks, it is possible to identify the wavelengths (channels) of the monochromatic pulse lights (optical packets) that are outputted in time series.

Now, two specific configurations of an optical packet generation apparatus according to the third embodiment will be described.

Figure 17:
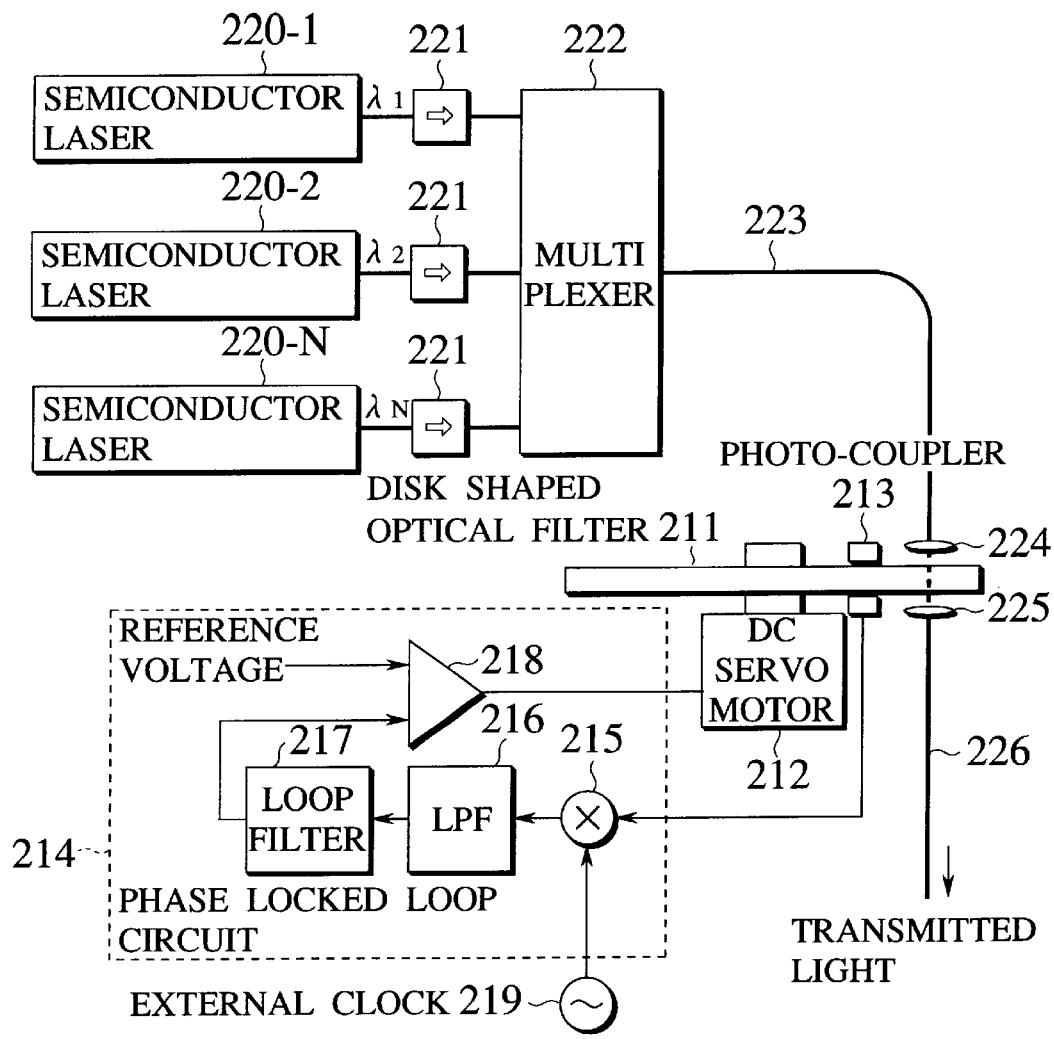
FIG. 17 is a block diagram showing a specific configuration of a first optical packet generation apparatus according to the third embodiment of the present invention.

FIG. 17 shows a configuration of a first optical packet generation apparatus according to the third embodiment, which uses a disk shaped optical filter 211 formed by a glass (quartz) disk substrate divided into a plurality of fan-shaped regions at prescribed central angles on which dielectric multi-layer optical filters with mutually different transmission wavelengths λn to λN are formed. This optical filter 211 is driven into rotations by a DC servo motor 212. A photo-coupler 213 is provided across the disk plane of the optical filter 211 in order to detect the marks provided on the optical filter 211. A phase locked loop (PLL) circuit 214 formed by a phase comparator 215 a low pass filter (LPF), 216, a loop filter 217, and a differential amplifier 218 is provided in order to control the number of rotations of the DE servo motor 212 according to a phase difference between the detection signal of the photo-coupler 213 and an external clock 219. In other words, the optical filter 211 is controlled to the number of rotations that is synchronized with the external clock 219.

There are also provided a plurality of semiconductor lasers 220-1 to 220-N which output optical beams with wavelengths coinciding with the transmission wavelengths $\lambda_1$ to $\lambda_N$ of the optical filter 211 respectively. These optical beams are entered into a multiplexer 222 through isolators 211 and wavelength division multiplexed there. The wavelength division multiplexed optical beams are incident on the optical filter 211 nearly perpendicularly as collimated optical beams through an optical filter 223 and a collimate lens 224, and transmitted optical beams from the optical filter 211 are collimated by the collimate lens 225 and entered into an optical filter 226.

More specifically, this optical packet generation apparatus of FIG. 17 can be constructed in practice as follows. The size of the glass disk substrate of the optical filter 211 is arbitrary, and it is possible to utilize a substrate with an outer diameter of 2.5 inches, an inner diameter of 15 mm, and a thickness of 2 mm that is compatible with the magneto-optic disk. The transmission characteristic of the optical filter 211 is trapezoidal, and it is possible to utilize a double cavity filter with the extinction ratio of 60 dB or more. Note that the transmission bandwidth can be set up arbitrarily. On the bottom face of the disk substrate, a wide bandwidth antireflection coating is formed.

The optical filter 211 is arranged nearly perpendicularly in an optical beam path of the collimated optical beams between the collimate lenses 224 and 225. Here, it is preferable to incline the optical filter 211 slightly with respect to the optical beam path in order to remove the influence of reflection, but it is not preferable to incline the optical filter 211 more than necessary because of the influence of the incident angle of the optical beams on the polarization dependency and the transmission wavelength. Also, the incident angle is hardly changed by the rotations for tuning, and influenced only by the disk plane vibration at times of rotations. However, the disk plane vibration is normally about 10 μm with respect to the diameter of 2.5 inches so that the change of the incident angle due to this factor can be ignored.

For the semiconductor layer 220, it is possible to utilize the DBR (Distributed Bragg-Reflector) laser in which the wavelength can be specified, an external cavity laser or an SSG (Super Structure Grating) laser in which the wavelength is tunable. The optical beams outputted from these individual semiconductor lasers are multiplexed by the multiplexer 222, and the low loss multiplexing can be realized here by using an arrayed waveguide diffraction grating filter as the multiplexer 222 provided that the wavelengths are sufficiently controlled. Apart from these individual semiconductor lasers, it is also possible to utilize a mode locked semiconductor laser that can output multiple wavelength optical beams by a single element.

Figure 18:
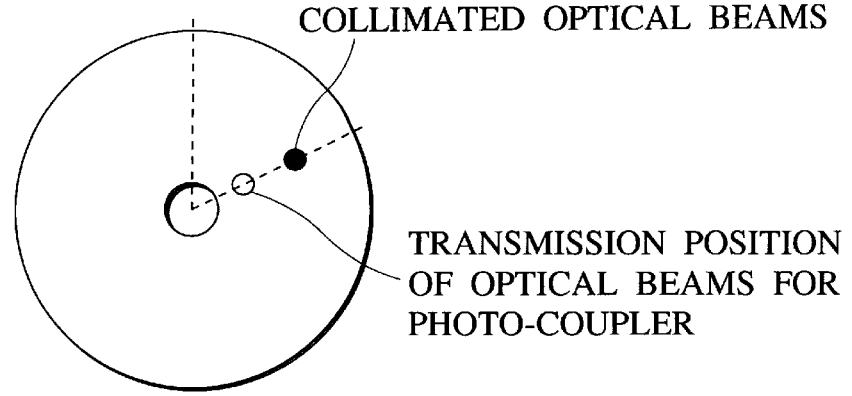
FIG. 18 is a diagram showing transmission positions of collimated optical beams and optical beams for photo-coupler on the disk shaped optical filter in the first optical packet generation apparatus of FIG. 17.

A plurality of marks to be formed at the prescribed central angles on the optical filter 211 can be formed on the glass substrate accurately by the transfer using the photolithography technique. These marks are optically detected by the photo-coupler 213. The transmission position of the collimated optical beams to be transmitted through the optical filter 211 and the transmission position of the optical beams for the photo-coupler are arranged at the same angle position as shown in FIG. 18.

Figure 19:
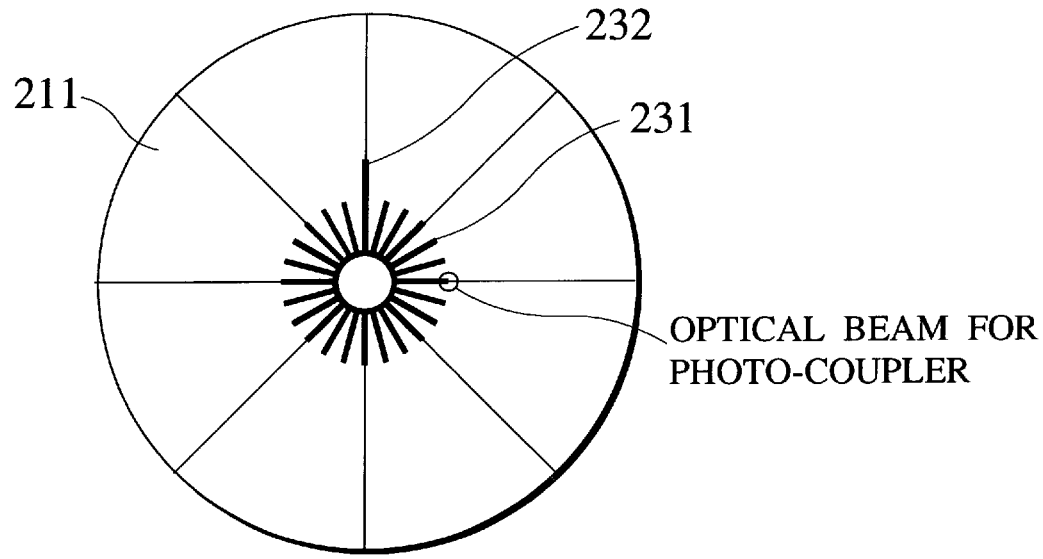
FIG. 19 is a diagram showing marks provided on the disk shaped optical filter in the first optical packet generation apparatus of FIG. 17.

Also, as shown in FIG. 19, by providing a plurality of marks 231 that are arranged at constant central angles for the purpose of controlling the number of rotations of the optical filter 211 and a mark 232 of a different length for the purpose of detecting one rotation of the optical filter 211 such that a half of the transmission position of the optical beams for the photo-coupler passes through the tip of the mark 231, it is possible to detect a period of one rotation of the optical filter 211 by detecting the mark 232 according to the level of the detection signal of the photo-coupler 213. Here, the marks 231 may be formed such that regions with different transmission wavelengths can be recognized according to the marks 231.

Also, by locking the phases of the detection signal of the photo-coupler 213 and the external clock 219, it is possible to control the time width of the optical packets so that it becomes possible to read or write data in the optical packets.

The switching time of the optical packets depends on the rotational speed of the optical filter 211 and the beam diameter of the optical beams incident on the optical filter 211. When the beam diameter is 100 μm, the rotational speed is 10000 rpm, and the rotational track radius is 25 mm, the switching time will be approximately 1 μs.

The optical beam during the switching falls across two adjacent regions so that two optical packets overlap with each other as shown in FIG. 16. In this way, the variation of the light intensity during the switching becomes small so that it is possible to prevent the burst due to the gain fluctuation or signal light input at a time of amplifying the optical pulses outputted in time series by the optical fiber amplifier or the like.

Figure 20:
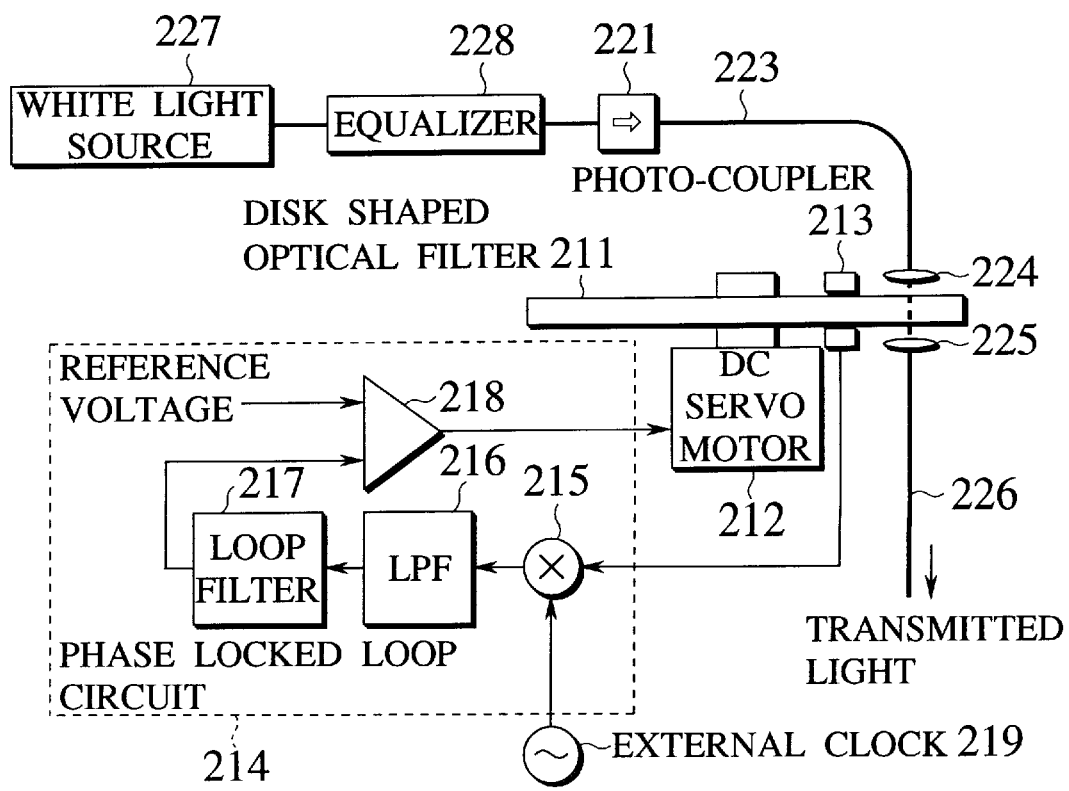
FIG. 20 is a block diagram showing a specific configuration of a second optical packet generation apparatus according to the third embodiment of the present invention.

FIG. 20 shows a configuration of a second optical packet generation apparatus according to the third embodiment, which differs from that of FIG. 17 in that a white light source 227 is used instead of the plurality of semiconductor lasers 220-1 to 220-N of FIG. 17, and the optical filter 211 has a narrow bandwidth dielectric multi-layer optical filter formed on the glass (quartz) disk substrate. Namely, the white lights outputted from the which light source 227 are passed through an equalizer 228 so as to average out the gain distribution, and then entered into the optical fiber 223 through the isolator 221. The rest of the configuration of FIG. 20 is substantially the same as that of FIG. 17.

For the white light source 227, the ASE (Amplified Spontaneous Emission) lights of the erbium-doped optical fiber amplifier or the SLD (Super Luminescent Diode) can be utilized. By using the white light source 227, it is possible to obtain the transmitted optical beams with a small intensity noise which are hardly affected by the characteristic change of the optical filter 211. Also, by averaging out the gain distribution using the equalizer 228, it is possible to make the output difference among the optical packets small.

It is also possible to use a laser source having multiple wavelengths corresponding to the transmission wavelengths of the optical filter 211 instead of the white light source 227.

As described, according to the third embodiment, it is possible to generate optical packets over a very wide wavelength bandwidth, by rotating the disk shaped optical filter divided into regions with different transmission wavelengths, and outputting in time series the monochromatic pulse lights of the wavelengths corresponding to the transmission wavelengths of the respective regions.

Referring now to FIG. 21 to FIG. 27, the fourth embodiment of the present invention will be described in detail. This fourth embodiment is directed to a tunable optical filter module realized by modifying the disk shaped optical filter of the first embodiment.

Figure 21:
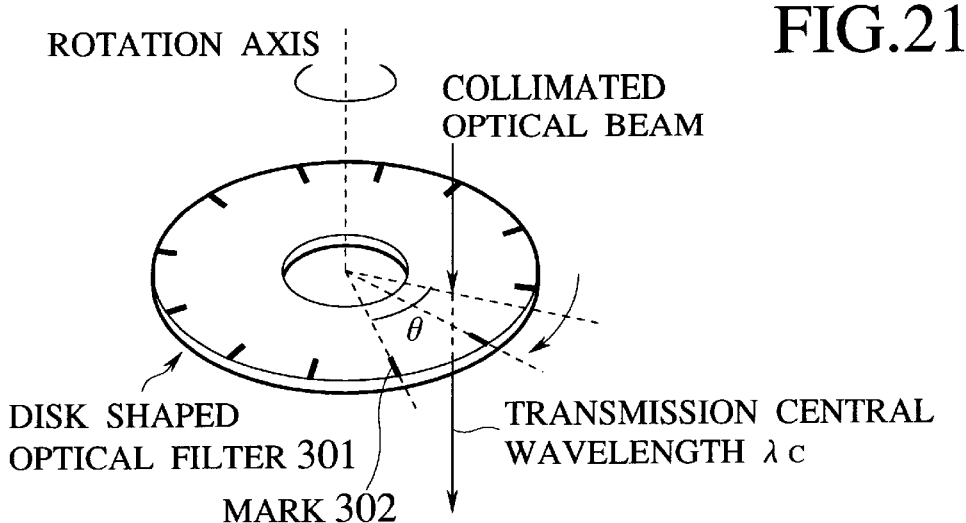
FIG. 21 is a diagram showing a disk shaped optical filter used in a tunable optical filter module according to the fourth embodiment of the present invention.
Figure 22:
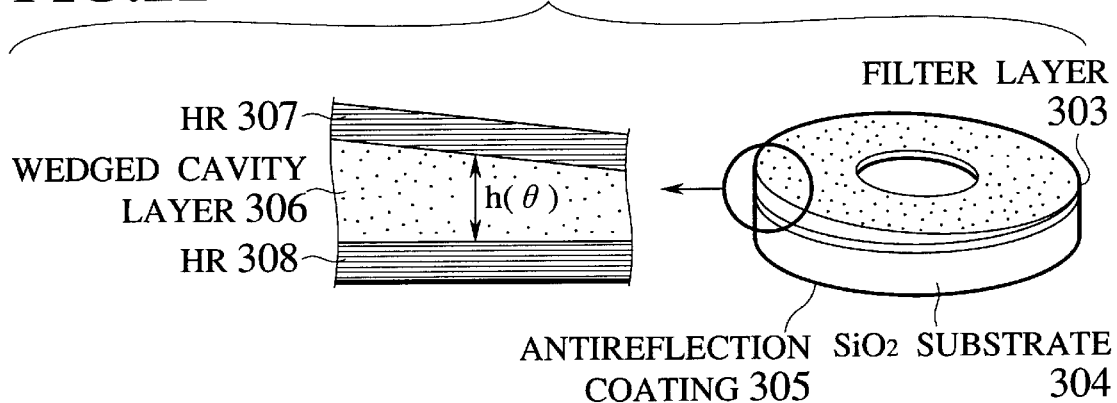
FIG. 22 is a diagram showing a configuration of the disk shaped optical filter used in the tunable optical filter module according to the fourth embodiment of the present invention.

In the first embodiment described above, the disk shaped optical filter 301 with a mark 302 as shown in FIG. 21 has been used. As shown in FIG. 22, this optical filter 301 can be formed by the filter layer 303 with the wedged cavity layer 306 of varying thickness which is provided on an $SiO_2$ substrate with an antireflection coating 305 applied on its bottom face. The transmission central wavelength of the filter layer 303 in which the wedged cavity layer 306 is sandwiched between high reflectivity layers (HR) 307 and 308 is proportional to the effective optical beam path length of the wedged cavity layer 306. Consequently, by accurately adjusting this effective optical beam path length to the specified value in relation to the viewing angle, it is possible to discriminate the transmission wavelength on the time axis at high precision by rotating the disk shaped optical filter 301 in synchronization.

However, it is practically difficult to manufacture such an optical filter with the cavity layer thickness accurately controlled in relation to the viewing angle by using the conventional manufacturing methods (such as the vacuum evaporation, sputtering film formation). For this reason, it can be practically difficult to accurately determine the wavelength to be discriminated according to the time and realize the spectrum analysis at high precision.

In view of this fact, the tunable optical filter module of this fourth embodiment incorporates a mechanism for correcting the transmission central wavelength at high speed by controlling the transmission position of the optical beams.

Here, the exemplary case where the relationship between the transmission central wavelength and the viewing angle is linear will be described. Note that the wavelength can be linearly scanned by rotating the disk at constant speed. This is convenient for the spectrum analysis because the time axis can be directly converted into the wavelength axis.

Figure 23:
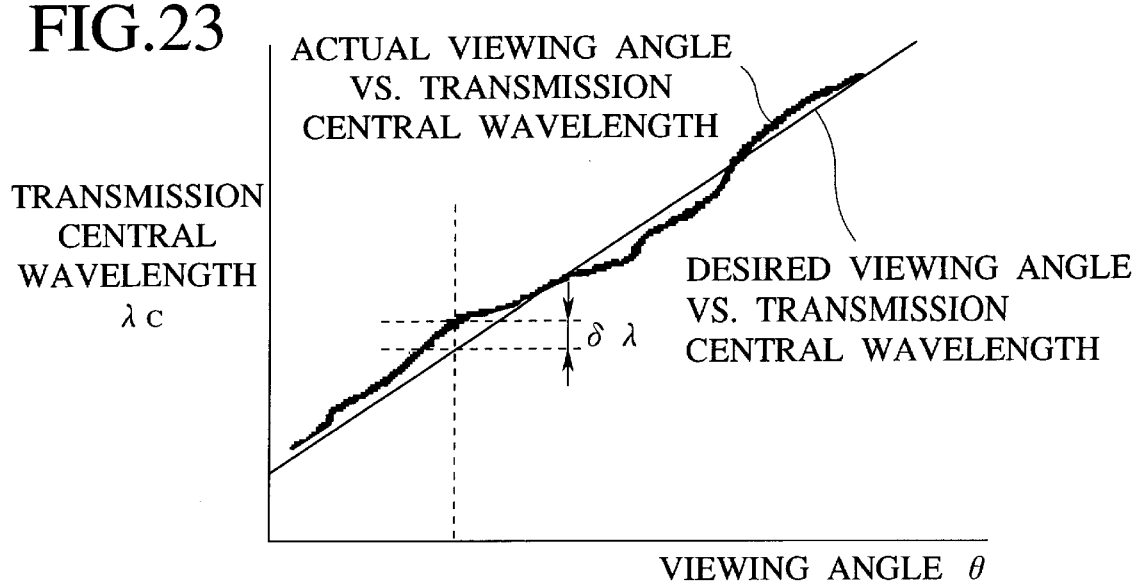
FIG. 23 is a graph showing an exemplary relationship between a transmission central wavelength and a viewing angle for the disk shaped optical filter used in the tunable optical filter module according to the fourth embodiment of he present invention.
Figure 24:
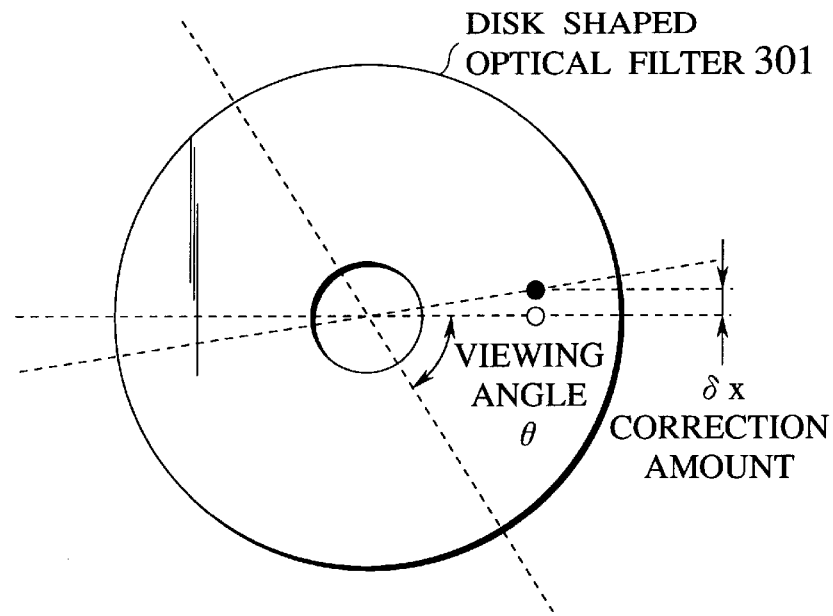
FIG. 24 is a diagram showing a correction of a transmission position of optical beams to be made in the tunable optical filter module according to the fourth embodiment of the present invention.

FIG. 23 shows an exemplary relationship between the transmission central wavelength and the viewing angle in the optical filter for practical use. Here, $\delta\lambda$ denotes a deviation from the linear relationship for the transmission central wavelength. This deviation is not occurring randomly with respect to the viewing angle, but changing continuously and gradually around the desired linear relationship. This is based on the fact that it is possible to change the cavity layer thickness continuously and gradually by the current filter film formation technique. By measuring such a deviation of the transmission central wavelength in advance over all the tunable angles such that the measurement results can be referred later on, it is possible to ascertain the deviation by detecting the viewing angle in the actual rotation state, and therefore it is possible to cancel out the deviation of the wavelength by correcting the transmission position of the optical beams in a direction tangent to the circumference as shown in FIG. 24.

More specifically, when the angle dependency of the transmission central wavelength of the optical filter is expressed as:

$$\lambda_c = \beta\theta + \lambda_0 \tag{6}$$

the amount of change of the transmission central wavelength due to the deviation $\delta X$ of the beam position in the circumferential direction can be expressed as:

$$\delta\lambda^* = \frac{\beta}{R}\delta x \tag{7}$$

Consequently, the amount of correction is determined such that $\delta\lambda^*$ coincides with $\delta\lambda$. It is possible to carry out this correction by following up the change even in a state where the disk is rotating, by taking a driving bandwidth of the head sufficiently wider compared with the disk rotation, and therefore it is possible to realize the ideal wavelength scanning (the completely linear scanning in this example).

Now, two specific configurations of a tunable optical filter module according to the fourth embodiment will be described.

Figure 25:
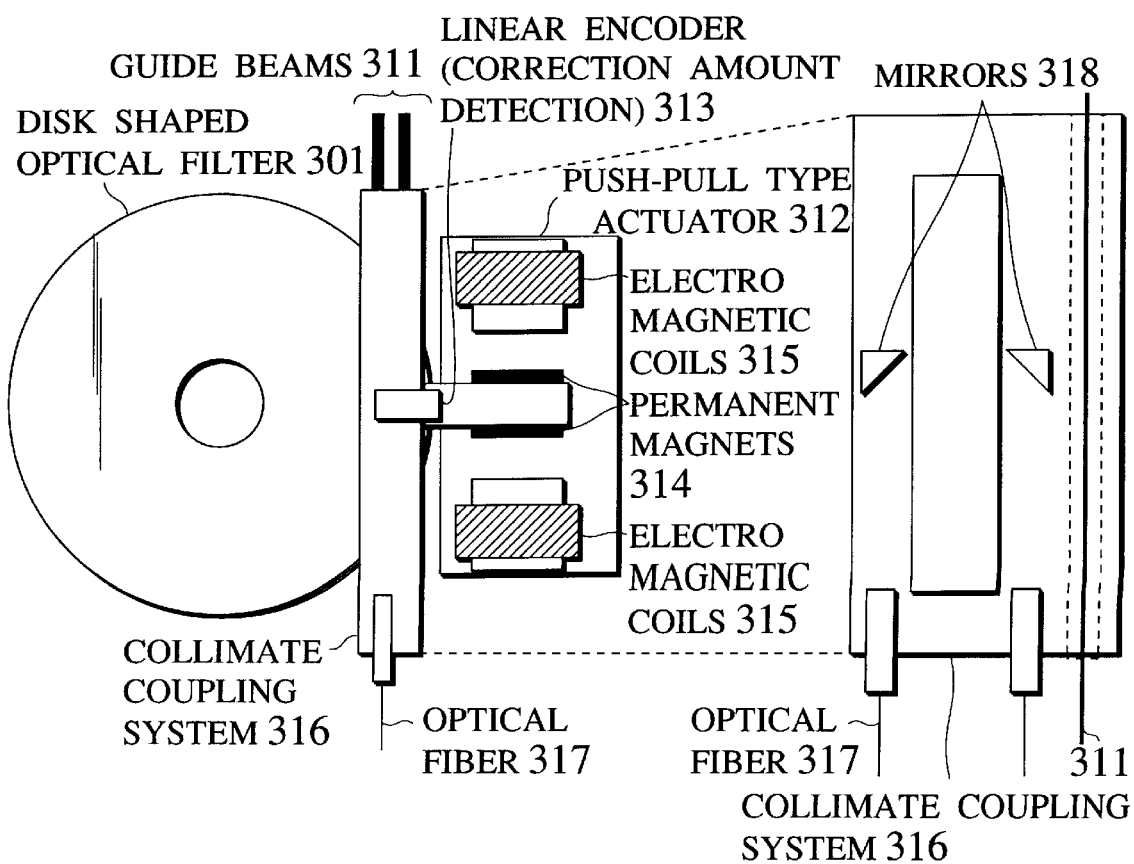
FIG. 25 is a diagram showing a configuration of a first tunable optical filter module according to the fourth embodiment of the present invention.

FIG. 25 shows a configuration of a first tunable optical filter module according to the fourth embodiment, which uses a push-pull type linear actuator 312 for a correction mechanism. In the configuration of FIG. 25, a rectangle shaped high rigidity frame is used for a collimate coupling system 316 in order to prevent the degradation of the coupling efficiency due to deformation of jig. On this frame, the optical fibers 317 are optically coupled by a folded beam shaped optical beam path using prism reflection mirrors 318. Note that such an optical system is necessary in realizing a thin tunable optical filter module in the case of using the optical filter of a large diameter. This frame is guided by two parallel guide beams 311 such that it is smoothly movable in the direction tangent to the circumference. The push-pull type actuator is formed by arranging two permanent magnets 314 opposing to each other on this frame and two electromagnetic coils 315 opposing to each other at outer sides of these permanent magnets 314 on this frame, and this push-pull type actuator can be operated by operating these two electromagnetic coils simultaneously so that it is possible to carry out the beam transmission position correction at high speed. In addition, the optimal control of the actuator is realized by the displacement detection using a linear encoder 313 provided on the collimate coupling system 316.

Figure 26:
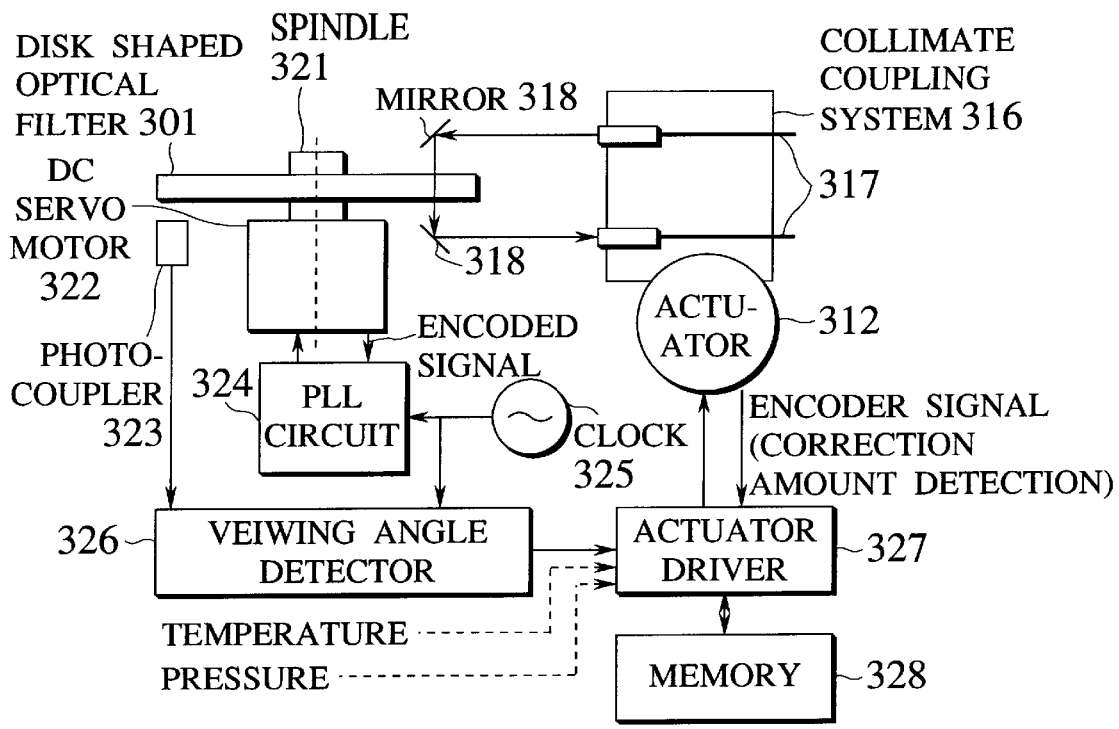
FIG. 26 is a block diagram showing a configuration of a control system for the tunable optical filter module according to the fourth embodiment of the present invention.

FIG. 26 shows a control system for effectuating such a correction of the transmission central wavelength. In FIG. 26, the optical filter 301 is clamped to a spindle 321 of a DC servo motor 322 is driving into stable rotations by a phase locked loop (PLL) circuit 324 according to rotary encoded signals and electric signals of a clock 325. On the other hand, using a signal detected from a mark provided on the disk as a reference, the viewing angle on the disk is detected on the time axis by a viewing angle detector 326 in synchronization with the frequency of the clock 325. An actuator driver 327 then calculates the amount of correction δX by referring to the angle and the amount of deviation stored in a memory 328 according to this viewing angle, and determines a value of driving signal to be applied to the actuator 312.

At this point, the amount of correction is monitored by the linear encoder 313 provided on the collimate coupling system 316 which is a movable portion. The deviation of the transmission central wavelength cannot be monitored continuously so that the feed-forward type control of the head by monitoring the deviation of the transmission central wavelength does not constitute the completely closed loop control and cannot deal with the abrupt changes, but the correction mechanism of the optical system is controlled by the closed loop control with respect to the optimal amount of correction.

Note also that, by adding the amounts of deviation based on temperature and pressure to the data stored in the memory 328 and monitoring temperature and pressure at a time of operating the tunable optical filter module as indicated in FIG. 26, it is also possible to correct the deviations due to temperature and pressure.

Figure 27:
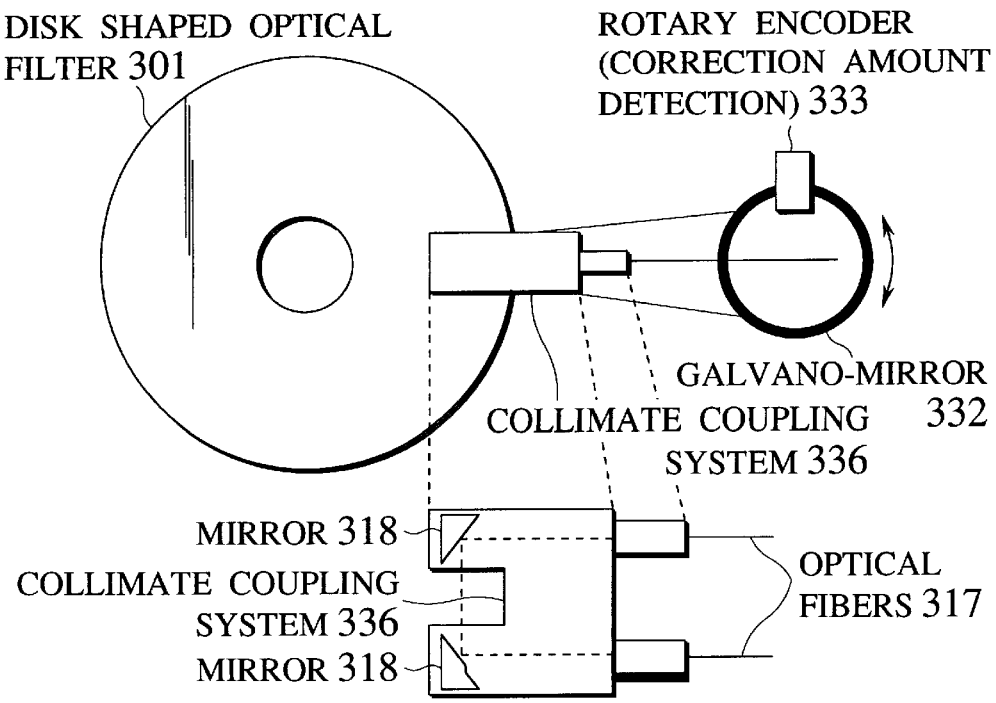
FIG. 27 is a diagram showing a configuration of a second tunable optical filter module according to the fourth embodiment of the present invention.

FIG. 27 shows a configuration of a second tunable optical filter module according to the fourth embodiment, which uses a push-pull type rotary actuator 332 for a correction mechanism. In the configuration of FIG. 27, the optical system traces the folded beam shaped optical beam path similarly as in the configuration of FIG. 25, and it is possible to adopt a deformation resistive cantilever structure by sufficiently lowering the spatial coupling length. The collimate coupling system 336 with such an optical system is arranged on a straight line passing through a rotation center of the optical filter 301 as shown in FIG. 27. By fixing this optical system to a spindle having its rotation center on the above straight line and rotating this bearing, it is possible to move the beam transmission position on the optical filter substantially in a tangential direction.

When the rotation angle δα is sufficiently small, the rotation angle and the deviation δX of the beam transmission position has the following proportional relationship:

$$\delta x = L \delta \alpha \quad (8)$$

where L is a length of an arm supporting the collimate beam (a distance from the rotation center to the beam position).

For the rotary actuator, it is possible to utilize a galvano-mirror which has a wide response bandwidth. The rotation angle is detected by an encoder (rotary encoder in this case) and fed back to the control system similarly as in the configuration of FIG. 25.

For the correction mechanism described above, the control system similar to that of FIG. 26 is applicable. However, there are differences in the relationship between the actuator and the amount of moving, the transfer function of the actuator, etc., so that there is a need to optimize each of these factors separately according to the system adopted.

Note that it is theoretically possible to realize the correction of the transmission central wavelength similar to that described above by using the rotational speed control on the DC servo motor that is rotating the optical disk directly, but the DC motor has a relatively large moment of inertia for the purpose of stable rotations so that it is expected to be difficult to make corrections by quickly responding to minute deviations of the transmission central wavelength.

As described, according to the fourth embodiment, it is possible to realize the complete wavelength scanning by correcting the tunable filter characteristic which may have some variations introduced at the manufacturing process. It is also possible to suppress the drift of the filter characteristic due to temperature and pressure. Consequently, it is possible to realize the wavelength spectrum analysis at high precision.

It is also to be noted that the disk shaped optical filter according to the present invention can be utilized in such a manner that the desired transmission central wavelength can be specified from outside solely in terms of time, using the clock as a reference for example.

It is also to be noted that, in the present invention, a combination of the photo-coupler and the marks provided on the disk shaped optical filter such as those provided along the circumference of the disk shaped optical filter shown in FIG. 21 can effectively function as a high precision encoder.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A disk shaped optical filter, comprising:
    a transparent substrate in a disk shape; and
    a filter layer formed on a top surface of the substrate, having such a filter characteristic that a transmission central wavelength varies along a circumferential direction as a monotonic function of a viewing angle.

2. The disk shaped optical filter of claim 1, wherein the filter layer has the filter characteristic in which the transmission central wavelength linearly increases or decreases with respect to the viewing angle.

3. The disk shaped optical filter of claim 1, wherein the filter layer includes a plurality of concentrically formed layers with mutually different filter characteristics.

4. The disk shaped optical filter of claim 1, wherein the filter layer is divided into a plurality of fan-shaped regions with mutually different transmission central wavelengths.

5. The disk shaped optical filter of claim 1, wherein the filter layer has a mark formed thereon which is to be used in detecting a start timing of a filter region provided by the filter layer when the disk shaped optical filter is set in rotations.

6. The disk shaped optical filter of claim 1, wherein the filter layer has wobble marks formed thereon which are to be used in track controlling when the disk shaped optical filter is set in rotations.

7. The disk shaped optical filter of claim 1, wherein the filter layer has a plurality of marks formed thereon radially at prescribed central angles which are to be used in controlling a number of rotations of the disk shaped optical filter when the disk shaped optical filter is set in rotations.

8. The disk shaped optical filter of claim 1, wherein the substrate is made of quartz, the filter layer is made of dielectric multi-layer, and the substrate has a wide bandwidth antireflection coating applied on a bottom surface.

9. A high speed wavelength discrimination apparatus, comprising:
  a disk shaped optical filter having such a filter characteristic that a transmission central wavelength varies long a circumferential direction, which is placed in an optical beam path of collimated optical beams; and
  a rotation mechanism for setting the disk shaped optical filter in high speed rotations in synchronization with external signals.

10. The apparatus of claim 9, wherein the disk shaped optical filter is arranged to be perpendicular to or slightly inclined from a state of being perpendicular to an optical axis of the collimated optical beams.

11. The apparatus of claim 9, wherein the rotation mechanism is a variable rotation mechanism capable of controlling the rotations of the disk shaped optical filter according to the external signals.

12. The apparatus of claim 9, wherein the disk shaped optical filter comprises:
  a transparent substrate made of quartz in a disk shape, and having a wide bandwidth antireflection coating applied on a bottom surface; and
  a filter layer made of dielectric multi-layer formed on a top surface of the substrate.

13. The apparatus of claim 9, wherein the disk shaped optical filter has the filter characteristic in which the transmission central wavelength varies linearly along the circumferential direction, and a mark formed thereon which is to be used in detecting a start timing of a filter region provided by the disk shaped optical filter when the disk shaped optical filter is set in rotations.

14. The apparatus of claim 13, further comprising:
  a timing detection mechanism for entering the collimated optical beams including signal lights and a timing detection light with a wavelength different from those of the signal lights into the disk shaped optical filter, separating the timing detection light from the signal lights after passing through the disk shaped optical filter, and detecting the start timing by detecting a signal level change of the timing detection light caused by the mark.

15. The apparatus of claim 9, further comprising:
  a calibration mechanism for forming reference grids by using the disk shaped optical filter, and calibrating the transmission central wavelength discriminated by the disk shaped optical filter with respect to the reference grids.

16. The apparatus of claim 15, wherein the calibration mechanism includes a multiple wavelength reference light source and a timing detection light source whose outputs are multiplexed and entered into the disk shaped optical filter in parallel to the collimated optical beams, where the reference grids are formed from the multiple wavelength reference lights after passing through the disk shaped optical filter.

17. The apparatus of claim 9, wherein the disk shaped optical filter has a plurality of concentrically formed filter layers with mutually different filter characteristics, and the apparatus further comprises:
  a tracking mechanism for track controlling the collimated optical beams with respect to a selected one of the plurality of filter layers.

18. A reference wavelength light generation apparatus, comprising:
  a single mode wavelength tunable semiconductor laser light source;
  a disk shaped optical filter having such a filter characteristic that a transmission central wavelength varies linearly with respect to a rotation angle, through which optical beams from the light source pass; and
  a servo motor for rotating the disk shaped optical filter in synchronization with a clock; and
  a control circuit for detecting an error between an oscillation wavelength of the light source and a specified wavelength, and generating a negative feed-back control signal to control the light source so as to cancel out the error.

19. The apparatus of claim 18, wherein the control circuit detects a time $t=t_0$ within one rotation period which gives the transmission central wavelength equal to the specified wavelength, samples intensities of transmitted optical beams at timings $t=t_0+\tau$, $t_0-\tau$ determined with respect to the time $t=t_0$, obtains a difference between sampled intensities, and generates a voltage proportional to the difference as the negative feed-back control signal.

20. An optical packet generation apparatus, comprising:
  a disk shaped optical filter having filter layers of respectively different transmission wavelengths formed on a plurality of fan-shaped regions which are divided at prescribed central angles;
  a rotation driving mechanism for rotating the disk shaped optical filter at a prescribed speed;
  a light source for outputting optical beams with at least two wavelengths which coincide with the transmission wavelengths of the filter layers;
  an optical beam input unit for setting the optical beams from the light source incident onto the disk shaped optical filter as collimated optical beams, substantially perpendicularly to a rotation plane of the disk shaped optical filter; and
  an optical beam output unit for collecting the collimated optical beams that pass through the disk shaped optical filter and outputting monochromatic optical packets of wavelengths corresponding to the transmission wavelengths of the filter layer in time series, in accordance with rotations of the disk shaped optical filter.

21. The apparatus of claim 20, wherein the disk shaped optical filter has a plurality of marks formed thereon radially at prescribed central angles, and the rotation driving mechanism controls a number of rotations of the disk shaped optical filter by detecting the marks.

22. The apparatus of claim 21, wherein the rotation driving mechanism synchronizes a phase of detection signals generated upon detecting the marks on the disk shaped optical filter that is set in rotations, with a phase of external control signals, such that the optical packets with a constant pulse width which are synchronized with the external control signals are outputted from the second optical beam path.

23. The apparatus of claim 21, wherein the disk shaped optical filter has the plurality of marks formed at borders of the plurality of fan-shaped regions.

24. The apparatus of claim 21, wherein the disk shaped optical filter also has another mark to be used in detecting one rotation of the disk shaped optical filter.

25. The apparatus of claim 21, further comprising:
  a photo-coupler for optically detecting the marks formed on the disk shaped optical filter, wherein a transmission position of an optical beam for the photo-coupler is arranged at an identical angular position as a transmission position of the collimated optical beams.

26. The apparatus of claim 20, wherein the filter layers of the disk shaped optical filter have narrow bandwidth transmission wavelengths, and the light source is a continuous white light source or a multiple wavelength laser light source.

27. A disk shaped optical filter module, comprising:

a disk shaped optical filter having such a filter characteristic that a transmission central wavelength varies along a circumferential direction with respect to a viewing angle;

a scanning mechanism for scanning a wide range of transmission central wavelengths by rotating the disk shaped optical filter while setting optical beams incident onto the disk shaped optical filter; and a correction mechanism for controlling a transmission position of the optical beams of the scanning mechanism in a tangential direction so as to correct a deviation of the transmission central wavelength scanned by the scanning mechanism.

28. The disk shaped optical filter module of claim 27, wherein the correction mechanism controls the transmission position of the optical beams by detecting a rotation angle of the disk shaped optical filter and using a predetermined amount of correction for each rotation angle of the disk shaped optical filter.

29. The disk shaped optical filter module of claim 27, wherein the correction mechanism includes a translational displacement unit using an actuator for linearly displacing the transmission position of the optical beams and a displacement monitoring unit for detecting a displacement made by the linear actuator.

30. The disk shaped optical filter module of claim 27, wherein the correction mechanism includes a rotational displacement unit using an actuator for rotationally displaying the transmission position of the optical beams and a displacement monitoring unit for detecting a displacement made by the rotary actuator.

31. The disk shaped optical filter module of claim 27, wherein the correction mechanism also corrects a deviation of the transmission central wavelength scanned by the scanning mechanism due to temperature or pressure.

* * * * *

UNITED STATES PATENT AND TRADEMARK OFFICE
CERTIFICATE OF CORRECTION

PATENT NO. : 6,157,025
DATED : December 5, 2000
INVENTOR(S) : Yoshitada Katagiri et al.

It is certified that error appears in the above-identified patent and that said Letters Patent is hereby corrected as shown below:

Column 10,
Line 45, change the formula to read $$-- \quad P(t) = \int \rho(\lambda, \omega t)\, u(t)\, d\lambda \qquad (3) \quad --.$$

Column 11,
Line 1, change the formula to read $$-- \quad P(t) = \frac{1}{1 + 4((\lambda(t)-\lambda_x)/\Delta\lambda)^2} - \frac{1}{1 + 4((a\omega t+\lambda_s-\lambda_x)/\Delta\lambda)^2} \quad (4) \quad --.$$

Signed and Sealed this

Twenty-seventh Day of November, 2001

*Attest:*

NICHOLAS P. GODICI
*Attesting Officer*     *Acting Director of the United States Patent and Trademark Office*